US012810813B2

(12) United States Patent
Jang et al.

(10) Patent No.: US 12,810,813 B2
(45) Date of Patent: Nov. 24, 2026

(54) DISPLAY DEVICE AND ELECTRONIC DEVICE

(71) Applicant: SAMSUNG DISPLAY CO., LTD., Yongin-si (KR)

(72) Inventors: Jae Yong Jang, Yongin-si (KR); Min Kyu Woo, Yongin-si (KR); Il Nam Kim, Yongin-si (KR); Min Jae Jeong, Yongin-si (KR); Jae Hyung Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/283,492

(22) Filed: Jul. 29, 2025

(65) Prior Publication Data

US 2026/0196178 A1 Jul. 9, 2026

(30) Foreign Application Priority Data

Jan. 9, 2025 (KR) ........................ 10-2025-0003546

(51) Int. Cl.
*G09G 3/36* (2006.01)
*G09G 3/3233* (2016.01)
*G09G 3/3266* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2300/0861* (2013.01); *G09G 2310/0286* (2013.01); *G09G 2310/08* (2013.01); *G09G 2330/021* (2013.01); *G09G 2340/0435* (2013.01)

(58) Field of Classification Search
None
See application file for complete search history.

(56) References Cited

U.S. PATENT DOCUMENTS 8,587,347 B2 11/2013 Yoon et al.
11,996,026 B1 5/2024 Kim et al.
2019/0348007 A1* 11/2019 Lee ...................... G09G 3/3648
2026/0024499 A1* 1/2026 Zheng .................. G09G 3/3266

FOREIGN PATENT DOCUMENTS

KR 10-1963595 B1 4/2019
KR 10-2024-0068866 A 5/2024

* cited by examiner

*Primary Examiner* — Carl Adams
(74) *Attorney, Agent, or Firm* — F. CHAU & ASSOCIATES, LLC

(57) ABSTRACT

A display device includes a plurality of pixels, a plurality of scan lines, and a scan driver connected to the plurality of pixels by the plurality of scan lines. The scan driver includes a plurality of scan stages configured to provide a plurality of scan signals to the plurality of scan lines. Each of the scan stages includes a first node voltage setting circuit configured to set a voltage of a first node based on a previous first carry signal received from a previous scan stage, and a carry signal providing circuit configured to generate a first carry signal based on a clock signal and the voltage of the first node. The carry signal providing circuit includes a clock input transistor comprising a gate electrode connected to the first node and a first electrode configured to receive the clock signal.

20 Claims, 16 Drawing Sheets

<ADDRESS SCAN>

<SELF SCAN>

<AUXILIARY SCAN>

DISPLAY DEVICE AND ELECTRONIC DEVICE

CROSS-REFERENCE TO RELATED APPLICATIONS

This application claims priority under 35 U.S.C. § 119 to Korean Patent Application No. 10-2025-0003546, filed on Jan. 9, 2025, the disclosure of which is incorporated by reference herein in its entirety.

TECHNICAL FIELD

Embodiments of the present disclosure relate to a display device and an electronic device.

DISCUSSION OF RELATED ART

As information technology continues to advance, display devices - serving as the interface between users and digital content - are becoming more prevalent. As a result, the adoption of display technologies such as, for example, liquid crystal displays (LCDs) and organic light-emitting diode (OLED) displays is growing.

Display devices typically include a scan driver, which is composed of multiple scan stages.

SUMMARY

Embodiments of the present disclosure provide a display device including a scan driver with reduced power consumption, and an electronic device including the same.

According to an embodiment of the present disclosure, a display device includes a plurality of pixels, a plurality of scan lines, and a scan driver connected to the plurality of pixels by the plurality of scan lines. The scan driver includes a plurality of scan stages configured to provide a plurality of scan signals to the plurality of scan lines. Each of the scan stages includes a first node voltage setting circuit configured to set a voltage of a first node based on a previous first carry signal received from a previous scan stage, and a carry signal providing circuit configured to generate a first carry signal based on a clock signal and the voltage of the first node. The carry signal providing circuit includes a clock input transistor comprising a gate electrode connected to the first node and a first electrode configured to receive the clock signal.

In an embodiment, each of the scan stages further includes an amplification circuit configured to generate a first amplified signal based on the first carry signal, and a scan signal providing circuit configured to generate a scan signal based on the first amplified signal.

In an embodiment, the first node voltage setting circuit is further configured to receive a next second carry signal from a next scan stage, and set the voltage of the first node further based on the next second carry signal.

In an embodiment, the carry signal providing circuit is further configured to generate a second carry signal based on the voltage of the first node and the clock signal. The carry signal providing circuit is further configured to invert the second carry signal to generate the first carry signal.

In an embodiment, the amplification circuit is further configured to generate the first amplified signal further based on the second carry signal.

In an embodiment, each of the scan stages further includes a width determining circuit configured to generate a third carry signal that determines a width of a scan signal based on the first carry signal and a previous third carry signal.

In an embodiment, each of the scan stages further includes an amplification circuit configured to generate a first amplified signal based on the third carry signal, and a scan signal providing circuit configured to generate a scan signal based on the first amplified signal.

In an embodiment, the first node voltage setting circuit is further configured to receive a next second carry signal from a next scan stage, and set a voltage of the first node further based on the next second carry signal.

In an embodiment, the carry signal providing circuit is further configured to generate a second carry signal based on the voltage of the first node and the clock signal, and to invert the second carry signal to generate the first carry signal.

In an embodiment, the width determining circuit is further configured to generate the first amplified signal further based on the second carry signal.

According to an embodiment of the present disclosure, an electronic device includes a processor configured to provide image data, and a display device configured to display an image based on grayscales of the image data. The display device includes a plurality of pixels, a plurality of scan lines, and a scan driver connected to the plurality of pixels by the plurality of scan lines. The scan driver includes a plurality of scan stages configured to provide a plurality of scan signals to the plurality of scan lines. Each of the scan stages includes a first node voltage setting circuit configured to set a voltage of a first node based on a previous first carry signal received from a previous scan stage, and a carry signal providing circuit configured to generate a first carry signal based on the voltage of the first node and a clock signal. The carry signal providing circuit includes a clock input transistor comprising a gate electrode connected to the first node, and a first electrode configured to receive the clock signal.

In an embodiment, each of the scan stages further includes an amplification circuit configured to generate a first amplified signal based on the first carry signal, and a scan signal providing circuit configured to generate a scan signal based on the first amplified signal.

In an embodiment, the first node voltage setting circuit is further configured to receive a next second carry signal from a next scan stage, and set the voltage of the first node further based on the next second carry signal.

In an embodiment, the carry signal providing circuit is configured to generate a second carry signal based on the voltage of the first node and the clock signal, and to invert the second carry signal to generate the first carry signal.

In an embodiment, the amplification circuit is further configured to generate the first amplified signal further based on the second carry signal.

In an embodiment, each of the scan stages further include a width determining circuit configured to generate a third carry signal that determines a width of a scan signal based on the first carry signal and a previous third carry signal.

In an embodiment, each of the scan stages further includes an amplification circuit configured to generate a first amplified signal based on the third carry signal, and a scan signal providing circuit configured to generate a scan signal based on the first amplified signal.

In an embodiment, the first node voltage setting circuit is further configured to receive a next second carry signal from a next scan stage, and set the voltage of the first node further based on the next second carry signal.

In an embodiment, the carry signal providing circuit is further configured to generate a second carry signal based on the voltage of the first node and the clock signal, and to invert the second carry signal to generate the first carry signal.

In an embodiment, the width determining circuit is further configured to generate the first amplified signal further based on the second carry signal.

BRIEF DESCRIPTION OF THE DRAWINGS

The above and other features of the present disclosure will become more apparent by describing in detail embodiments thereof with reference to the accompanying drawings.

DETAILED DESCRIPTION

Figure 1:
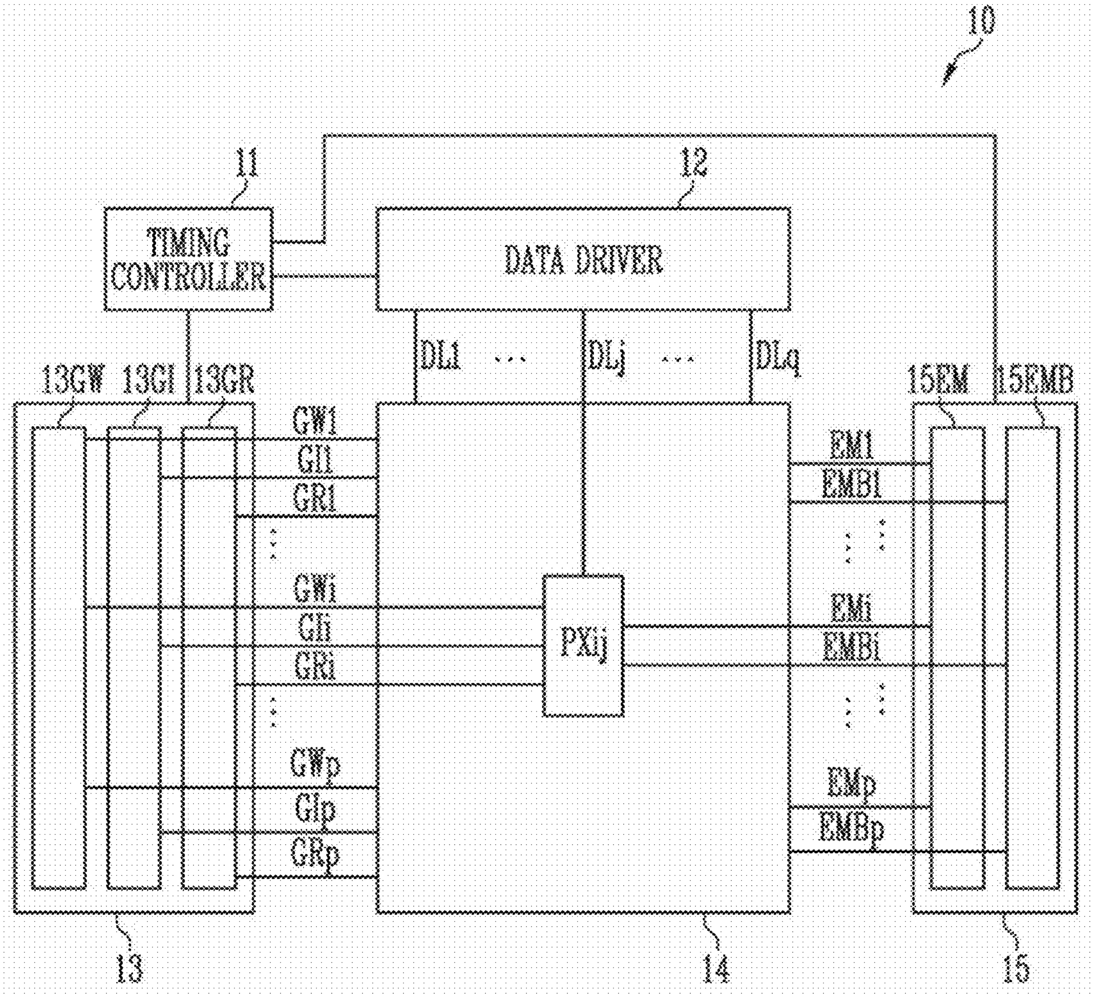
FIG. 1 is a diagram illustrating a display device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art, for example, within ±30%, 20%, 10% or 5% of the stated value. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Embodiments of the present disclosure relate to a display device that includes a scan driver configured to efficiently generate and propagate scan signals across a display panel. Embodiments address conventional challenges associated with power consumption and signal timing by introducing an improved scan stage architecture.

Each scan stage may include a first node voltage setting circuit that adjusts an internal node based on carry signals from both the previous and next scan stages. In addition, a carry signal providing circuit may generate carry signals using a clock input transistor, where the clock signal is applied to the channel instead of the gate. This structure may help reduce power loss by reducing parasitic gate capacitance effects during operation.

Through coordinated signal control and energy-efficient circuit design, the scan stages according to embodiments of the present disclosure can support accurate and stable scan signal propagation. Embodiments may support the demands of display devices that operate at high resolutions or fast refresh rates, where precise timing and reduced power consumption improve overall performance.

FIG. 1 is a diagram illustrating a display device according to an embodiment of the present disclosure.

Referring to FIG. 1, a display device 10 according to an embodiment of the present disclosure may include a timing controller 11, a data driver 12, a scan driver 13, a pixel unit 14 (also referred to as a display panel), and an emission driver 15.

The timing controller 11 may receive grayscales corresponding to an input image (or input frame). The grayscales may include a first color grayscale, a second color grayscale, and a third color grayscale. The first color grayscale may represent a first color, the second color grayscale may represent a second color, and the third color grayscale may represent a third color.

Further, the timing controller 11 may receive a control signal for an image. Such a control signal may include a horizontal synchronization signal (Hsync), a vertical synchronization signal (Vsync), a data enable signal, maximum luminance information, and the like. The vertical synchronization signal may include a plurality of pulses, and may indicate that a previous frame period ends and a current frame period begins based on a time point at which each of the pulses occurs. The interval between adjacent pulses of the vertical synchronization signal may correspond to one frame period. The horizontal synchronization signal may include a plurality of pulses, and may indicate that a previous horizontal period ends and a new horizontal period begins based on a time point at which each of the pulses occurs. The interval between adjacent pulses of the horizontal synchronization signal may correspond to one horizontal period. The data enable signal may have an enable level for certain horizontal periods and may have a disable level for the rest of the period. When the data enable signal is at the enable level, it may indicate that color grayscales are supplied in corresponding horizontal periods.

The maximum luminance information may be information on the maximum luminance of the display device 10. The maximum luminance may be luminance information of light emitted from pixels set to the maximum grayscale. For example, the maximum luminance may be the luminance of white light generated by all pixels of the pixel unit 14 emitting light corresponding to white grayscale. The unit of luminance may be a Nit. The maximum luminance may be referred to as a display brightness value. This maximum luminance may be set passively by a user's operation on the display device 10, or may be automatically set by an algorithm associated with an illuminance sensor or the like. For example, the maximum value of the maximum luminance may be about 1200 nits, and the minimum value may be about 4 nits. The maximum value and the minimum value of the maximum luminance may be variously set according to the product.

Even for the same grayscale, the emission luminance of a pixel may vary depending on the maximum luminance. For example, a change in the maximum luminance may result in a change in the duty ratio of the first emission signals. A change in the maximum luminance may also cause different data voltages to be applied for the same grayscale. In some cases, both the duty ratio and the data voltage of the first emission signals may be adjusted simultaneously.

The timing controller 11 may provide the data driver 12 with grayscales rendered or corrected to meet the specifications of the display device 10. Further, the timing controller 11 may provide a clock signal, a scan start signal, and the like to the scan driver 13. The timing controller 11 may provide a clock signal, an emission start signal, and the like to the emission driver 15.

The data driver 12 may use the grayscales and control signals received from the timing controller 11 to generate data voltages to provide to the data lines DL1, . . . , DLj, . . . , and DLq. For example, the data driver 12 may sample grayscales using a clock signal and apply data voltages corresponding to the grayscales to the data lines in units of pixel rows. q may be an integer greater than 1, and j may be an integer larger than 0 and smaller than q.

The scan driver 13 may include first to third scan drivers 13GW, 13GI, and 13GR. The first scan driver 13GW may provide first scan signals to the first scan lines GW1, . . . , GWi, . . . , and GWp. p may be an integer greater than 1, and i may be an integer larger than 0 and smaller than p. The second scan driver 13GI may provide second scan signals to the second scan lines GI1, . . . , GIi, . . . , and GIp. The third scan driver 13GR may provide third scan signals to the third scan lines GR1, . . . , GRi, . . . , and GRp.

For example, the first scan driver 13GW may receive at least one scan clock signal and a scan start signal from the timing controller 11 to generate first scan signals to be provided to the first scan lines GW1 to GWp. The first scan driver 13GW may sequentially provide first scan signals having a turn-on level of pulse to the first scan lines GW1 to GWp. For example, the first scan driver 13GW may be configured in the form of a shift register, and may generate the first scan signals by sequentially transmitting a scan start signal in the form of a pulse of a turn-on level to a next scan stage according to control of the scan clock signal. Since the second scan driver 13GI and the third scan driver 13GR may be configured substantially the same as the first scan driver 13GW, a redundant description thereof will be omitted.

The emission driver 15 may include a first emission driver 15EM and a second emission driver 15EMB. The first emission driver 15EM may provide first emission signals to the first emission lines EM1, . . . , EMi, . . . , and EMp. The second emission driver 15EMB may provide second emission signals to the second emission lines EMB1, . . . , EMBi, . . . , and EMBp.

For example, the first emission driver 15EM may receive at least one emission clock signal and an emission start signal from the timing controller 11 to generate first emission signals to be provided to the first emission lines EM1 to EMp. The first emission driver 15EM may sequentially provide emission signals having a turn-on level pulse to the first emission lines EM1 to EMp. For example, the first emission driver 15EM may be configured in the form of a shift register, and may generate first emission signals by sequentially transmitting an emission start signal in the form of a pulse of a turn-on level to a next emission stage according to control of the emission clock signal. Since the second emission driver 15EMB may be configured substantially the same as the first emission driver 15EM, a redundant description thereof will be omitted.

In FIG. 1, the first scan lines GW1 to GWp, the second scan lines GI1 to GIp, the third scan lines GR1 to GRp, the first emission lines EM1 to EMp, and the second emission lines EMB1 to EMBp are each shown as p. However, embodiments are not limited thereto. For example, in an embodiment, at least one of the second scan lines GI1 to GIp, the third scan lines GR1 to GRp, the first emission lines EM1 to EMp, and the second emission lines EMB1 to EMBp may be configured to be equal to or less than p/2. For example, two adjacent pixel rows may share one second scan line. Similarly, two adjacent pixel rows may share one third scan line, one first emission line, or one second emission line. The same pixel row means pixels connected to the same first scan line.

The pixel unit 14 includes a plurality of pixels. Each pixel PXij may be connected to a corresponding data line DLj, scan lines GWi, GIi, GRi, and emission lines EMi, EMBi. Each pixel PXij may include a light-emitting element that emits light based on the received data voltage.

The pixel unit 14 may include first pixels that emit light of the first color, second pixels that emit light of the second color, and third pixels that emit light of third color. The first color, the second color, and the third color may be different colors. For example, the first color may be one of red, green, and blue, the second color may be one color other than the first color among red, green, or blue, and the third color may be the other color other than the first and second colors among red, green and blue. In addition, magenta, cyan, and yellow may be used instead of red, green, and blue in the first to third colors.

The pixel unit 14 may be disposed in various forms such as, for example, diamond PENTILE™, RGB-stripe, S-stripe, real RGB, and normal PENTILE™.

Figure 2:
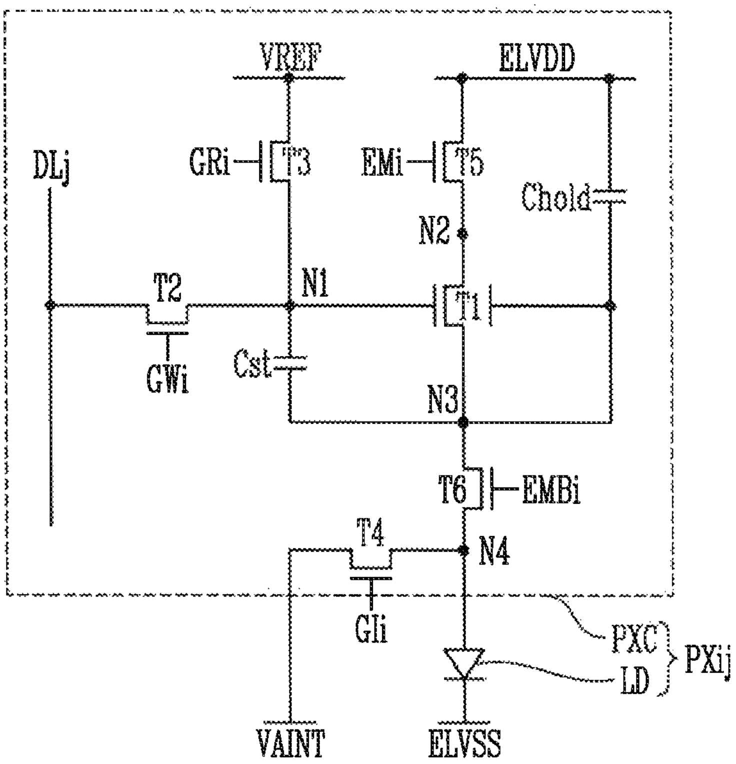
FIG. 2 is a diagram illustrating a pixel according to an embodiment of the present disclosure.
Figure 3:
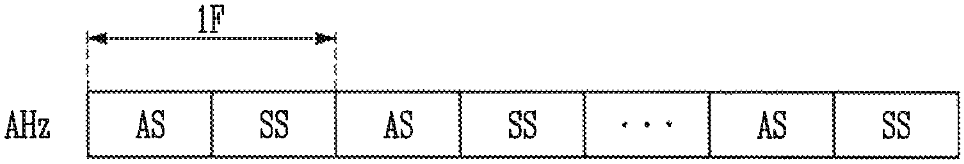
FIGS. 3 to 6 are diagrams for describing a change in a display frequency according to an embodiment of the present disclosure.
Figure 4:
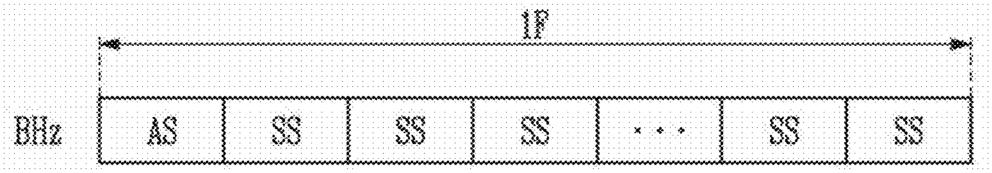

FIG. 2 is a diagram illustrating a pixel according to an embodiment of the present disclosure.

Referring to FIG. 2, a pixel PXij according to an embodiment of the present disclosure may include a pixel circuit PXC and a light-emitting element LD. The pixel circuit PXC may include transistors T1, T2, T3, T4, T5, and T6, a first capacitor Cst, and a second capacitor Chold.

Hereinafter, a circuit including an N-type transistor will be described as an example. However, those skilled in the art will be able to design a circuit composed of a P-type transistor by varying the polarity of the voltage applied to the gate terminal. Similarly, those skilled in the art will be able to design circuits composed of a combination of P-type transistors and N-type transistors. A P-type transistor collectively refers to a transistor in which an amount of current increases when a voltage difference between a gate electrode and a source electrode increases in a negative direction. An N-type transistor collectively refers to a transistor in which the amount of current increases when the voltage difference between the gate electrode and the source electrode increases in a positive direction. The transistor may be configured in various forms such as, for example, a thin film transistor (TFT), a field effect transistor (FET), and a bipolar junction transistor (BJT).

Hereinafter, a case where each of the transistors T1, T2, T3, T4, T5, and T6 is formed of an N-type oxide semiconductor transistor is assumed. In an embodiment not described hereinafter, the transistors T1, T2, T3, T4, T5, and T6 may be P-type silicon semiconductor transistors. In an embodiment not described hereinafter, some of the transistors T1, T2, T3, T4, T5, and T6 may be N-type oxide semiconductor transistors, and others may be P-type silicon semiconductor transistors.

The oxide semiconductor transistor may be a low temperature polycrystalline oxide (LTPO) thin film transistor in which an active pattern (semiconductor layer) includes an oxide. However, this is an example, and N-type transistors are not limited thereto. For example, the active pattern (semiconductor layer) included in the N-type transistor may include an inorganic semiconductor (e.g., amorphous silicon, polysilicon), an organic semiconductor, or the like. The silicon semiconductor transistor may be a low temperature poly-silicon (LTPS) thin film transistor in which an active pattern (semiconductor layer) includes amorphous silicon, poly silicon, or the like.

The first transistor T1 may have a first gate electrode connected to the first node N1 and a second gate electrode connected to a third node N3. The second gate electrode of the first transistor T1 may be configured to adjust a characteristic of an output current with respect to an input voltage of the first transistor. For example, the first transistor T1 mainly operates in a saturation state. In this case, if there is no second gate electrode of the first transistor T1, the magnitude of the output current may vary according to a change in the drain-source voltage even though the gate-source voltage is the same. According to an embodiment, the characteristic of the first transistor T1 is adjusted so as to be insensitive to a change in the drain-source voltage, so that the first transistor T1 outputs substantially the same current for the same gate-source voltage. The first transistor T1 may control the amount of driving current flowing from the first power supply voltage ELVDD to the second power supply voltage ELVSS. Accordingly, the first transistor T1 may be referred to as a driving transistor. A first electrode of the first transistor T1 may be connected to the second node N2, and a second electrode may be connected to a third node N3.

The second transistor T2 may have a gate electrode connected to the first scan line GWi, a first electrode connected to the data line DLj, and a second electrode connected to a first node N1. The second transistor T2 may receive a data voltage applied to the data line DLj.

The third transistor T3 may have a gate electrode connected to the third scan line GRi, a first electrode that receives the reference voltage VREF, and a second electrode connected to the first node N1. The reference voltage VREF may be supplied from a reference voltage source. The third transistor T3 may apply a reference voltage VREF to the first node N1 to initialize the voltage of the first node N1 to the reference voltage VREF.

The fourth transistor T4 may have a gate electrode connected to the second scan line GIi, a first electrode receiving the initialization voltage VAINT, and a second electrode connected to the fourth node N4. The initialization voltage VAINT may be supplied from an initialization voltage source. The fourth transistor T4 may apply the initialization voltage VAINT to the fourth node N4 to initialize the voltage of the fourth node N4 to the initialization voltage VAINT. Accordingly, the fourth transistor T4 may be referred to as an initialization transistor.

The initialization transistor (e.g., the fourth transistor T4) may supply the initialization voltage VAINT to the anode electrode (e.g., the fourth node N4) of the light-emitting element LD when receiving a turn-on level initialization signal (for example, the second scan signal), and may stop supplying the initialization voltage VAINT when receiving a turn off level initialization signal.

A gate electrode of the fifth transistor T5 may be connected to the first emission line EMi, a first electrode of the fifth transistor T5 may receive the first power supply voltage ELVDD, and a second electrode of the fifth transistor T5 may be connected to a second node N2. The fifth transistor T5 may adjust opening and closing of a driving current path from the first power supply voltage ELVDD to the second power supply voltage ELVSS. Accordingly, the fifth transistor T5 may be referred to as an emission transistor.

The emission transistor (e.g., the fifth transistor T5) may pass a driving current when receiving an emission signal (e.g., a first emission signal) at a turn-on level and block the driving current when receiving the emission signal at a turn-off level.

The sixth transistor T6 may have a gate electrode connected to the second emission line EMBi, a first electrode connected to the third node N3, and a second electrode connected to the fourth node N4. The sixth transistor T6 may adjust opening and closing of a driving current path from the first power supply voltage ELVDD to the second power supply voltage ElvSS.

The first capacitor Cst may connect the first node N1 and the third node N3. A first electrode of the second capacitor Chold may receive the first power supply voltage ELVDD, and a second electrode of the second capacitor Chold may be connected to the third node N3. The first electrode of the second capacitor Chold may be connected to a constant voltage source other than a voltage source that provides the first power supply voltage ELVDD. For example, the first electrode of the second capacitor Chold may be coupled to an initialization voltage source that provides an initialization voltage VAINT. For example, the first electrode of a second capacitor Chold may be coupled to a reference voltage source that provides a reference voltage VREF.

In the light-emitting element LD, an anode electrode may be connected to the fourth node N4, and a cathode electrode may receive the second power supply voltage ELVSS. The light-emitting element LD may be a light-emitting diode. For example, the light-emitting element LD may be an organic light-emitting diode, an inorganic light-emitting diode, a quantum dot/well light-emitting diode, or the like. In an embodiment, only one light-emitting element LD is provided in each pixel. In an embodiment, a plurality of light-emitting elements may be provided in each pixel. In this case, a plurality of light-emitting elements may be connected in series, parallel, or in series-parallel. The light-emitting element LD of each pixel PXij may emit light in one of the first color, the second color, and the third color.

FIGS. 3 to 6 are diagrams for describing a change in a display frequency according to an embodiment of the present disclosure.

The display device 10 can support a variable refresh rate. The refresh rate is a frequency at which a data voltage is written to the pixel PXij, also referred to as a screen scan rate and a screen reproduction rate, and may indicate the number of image frames reproduced for one second.

The pixel unit 14 may display an image at a first frequency AHz in the first mode (see FIG. 3) and display an image at a second frequency BHz smaller than the first frequency AHz (see FIG. 4) in the second mode.

For example, each frame period 1F in the first mode may include one address scan period AS and one self-scan period SS for each pixel PXij. For example, each frame period 1F in the second mode may include, for each pixel PXij, one address scan period AS and a plurality of self-scan periods SS. As the second frequency BHz is smaller, the number of self-scan periods SS included in one frame period 1F may increase. For example, each frame period 1F in a particular mode may include, for each pixel PXij, only one address scan period AS, and not a self-scan period SS.

The address scan period AS is a period in which a data voltage is written to the pixel PXij. The address scan period AS may be referred to as a Data Programming period that receives a data voltage from the data line DLj.

The self-scan period SS is a period in which a data voltage is not written to the pixel PXij. During the emission period of the self-scan period SS, the pixel PXij may emit light using the data voltage written in the address scan period AS. For example, the length of the self-scan period SS may be the same as the length of the address scan period AS.

The pixel unit 14 may display an image at a third frequency CHz in the third mode (see FIG. 5) and display an image at the fourth frequency DHz smaller than the third frequency CHz (see FIG. 6) in the fourth mode.

In the third mode and the fourth mode, an auxiliary scan period XS subsequent to the address scan period AS and an auxiliary scan period XS subsequent to the self-scan period SS may be included.

The auxiliary scan period XS may be similar to the self-scan period SS in that it is a period in which the data voltage is not written to the pixel PXij. During the emission period of the auxiliary scan period XS, the pixel PXij may emit light using the data voltage written in the address scan period AS. For example, the length of the auxiliary scan period XS may be the same as the length of the address scan period AS. However, the auxiliary scan period XS is different from the self-scan period SS in that the second scan signal of the turn-on level is not supplied. This will be described in further detail with reference to FIGS. 8 and 9.

The display device 10 does not necessarily include all of the first mode, the second mode, the third mode, and the fourth mode to be driven. The display device 10 may be driven only in at least one of the first mode, the second mode, the third mode, and the fourth mode. For example, the display device 10 may be driven in only one of the first mode, the second mode, the third mode, and the fourth mode. Further, the display device 10 may be driven only in the first mode and the second mode, and may not be driven in the third mode and the fourth mode. The display device 10 may be driven only in the third mode and the fourth mode, and may not be driven in the first mode and the second mode.

Figure 7:
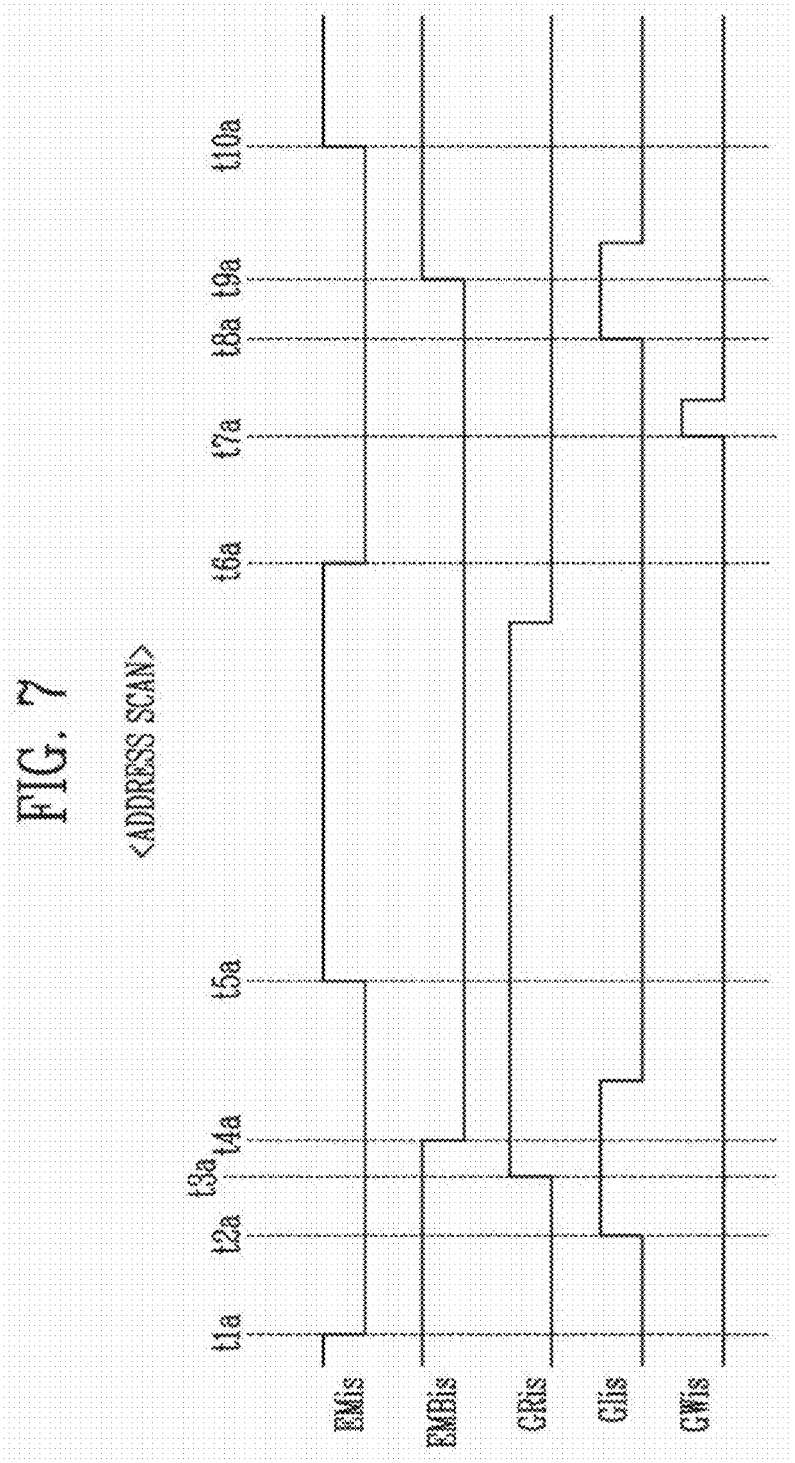
FIG. 7 is a diagram illustrating an address scan period according to an embodiment of the present disclosure.

FIG. 7 is a diagram illustrating an address scan period according to an embodiment of the present disclosure.

The address scan period of FIG. 7 is an example of the address scan period AS of FIGS. 3-6. Hereinafter, a pixel row connected to the i-th scan lines GWi, GIi, and GRi and the i-th emission lines EMi and EMBi will be described.

First, a first emission signal EMis at a turn-off level (e.g., a low level) may be applied to the first emission line EMi at the time point t1*a*. Accordingly, the fifth transistor T5 is turned off, and the emission period based on the data voltage written in the previous frame period ends.

Next, a second scan signal GIis at a turn-on level (e.g., a high level) is applied to the second scan line GIi at the time point t2*a*, whereby the fourth transistor T4 can be turned on. Accordingly, an initialization voltage VAINTa may be applied to the fourth node N4. Accordingly, the anode voltage of the light-emitting element LD can be initialized. In this case, since the sixth transistor T6 is in the turn-on state, the initialization voltage VAINT may also be applied to the third node N3. Accordingly, the voltage of the second electrode of the second capacitor Chold may be initialized.

Next, the third scan signal GRis at the turn-on level is applied to the third scan line GRi at the time point t3*a*, whereby the third transistor T3 can be turned on. Accordingly, the reference voltage VREF may be applied to the first node N1. Accordingly, the voltage across the first capacitor Cst may be initialized.

Next, the second emission signal EMBis at the turn-off level is applied to the second emission line EMBi at the time point t4*a*, whereby the sixth transistor T6 can be turned off. Accordingly, the third node N3 and the fourth node N4 may be electrically separated from each other.

Next, the first emission signal EMis at the turn-on level is applied to the first emission line EMi at the time point t5*a*, whereby the fifth transistor T5 can be turned on. As described above, the voltage across the first capacitor Cst has been initialized, and at the time point t5*a*, the first capacitor Cst may be in a state in which the voltage difference between the gate electrode (first node N1) and the source electrode (third node N3) of the first transistor T1 is maintained higher than the threshold voltage of the first transistor T1. Accordingly, the first transistor T1 may be in a turn-on state at the time point t5*a*. In this case, since the current is supplied from the first power supply voltage ELVDD through the turned-on fifth transistor T5 and the first transistor T1, the voltage of the third node N3 may gradually increase. When the voltage difference between the gate electrode (the first node N1) and the source electrode (the third node N3) of the first transistor T1 reaches the threshold voltage of the first transistor, the first transistor T1 may be turned off, and the voltage of the third node N3 may be maintained. Accordingly, the first capacitor Cst may store a voltage corresponding to the threshold voltage of the first transistor T1. A period in which a voltage corresponding to the threshold voltage of the first transistor T1 is stored in the first capacitor Cst may be referred to as a compensation period. The compensation period ends when the first emission signal EMis at the turn-off level is supplied at the time point t6*a*.

Next, the first scan signal GWis at the turn-on level is applied to the first scan line GWi at the time point t7*a*, whereby the second transistor T2 can be turned on. In this case, as the data voltage is applied to the data line DLj, the data voltage may be written to the first node N1. The voltage of the third node N3 may vary according to the capacitance ratio of the capacitors Cst and Chold and the voltage of the third node N3 stored in advance in the compensation period.

Next, the second scan signal GIis at the turn-on level is applied to the second scan line GIi at the time point t8*a*, whereby the fourth transistor T4 can be turned on. Therefore, since the anode voltage of the light-emitting element LD is initialized to the initialization voltage VAINT, it is possible to effectively represent a low grayscale such as a black grayscale.

Next, at the time point t9*a*, the second emission signal EMBis at the turn-on level is applied to the second emission line EMBi, whereby the sixth transistor T6 can be turned on. Accordingly, the first transistor T1 can be connected to the anode of the light-emitting element LD.

Next, at the time point t10*a*, the first emission signal EMis at the turn-on level is applied to the first emission line EMi, whereby the fifth transistor T5 can be turned on. Accordingly, a driving current path connected through the first power supply voltage ELVDD, the fifth transistor T5, the first transistor T1, the sixth transistor T6, and the second power supply voltage ELVSS is generated, and the light-emitting element LD can emit light with luminance based on the driving current flowing along the driving current path. For example, the light-emitting element LD can emit light with luminance corresponding to the amount of driving current.

Figure 8:
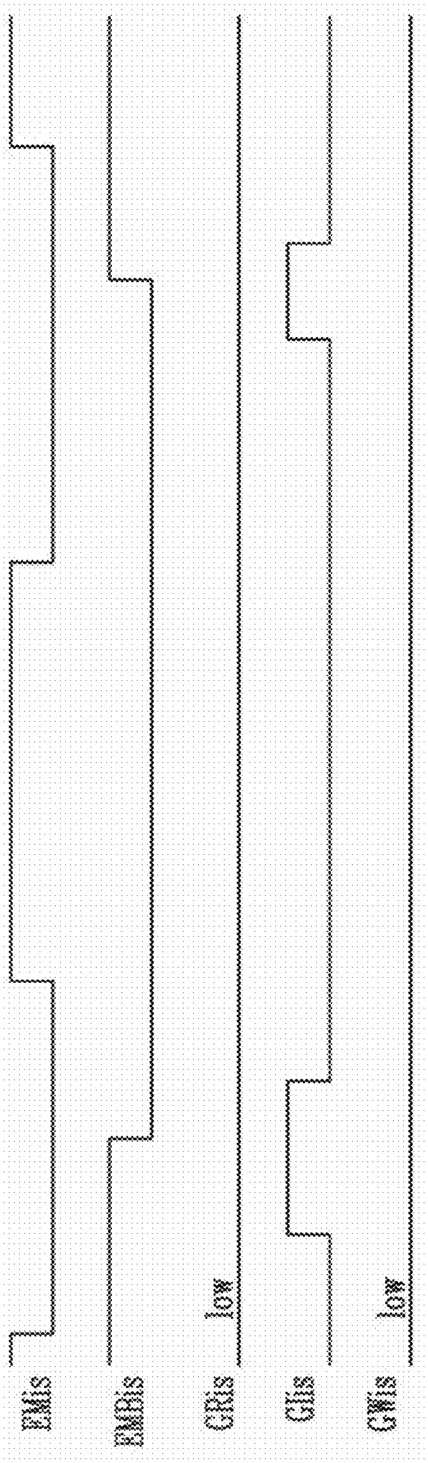
FIG. 8 is a diagram illustrating a self-scan period according to an embodiment of the present disclosure.

FIG. 8 is a diagram illustrating a self-scan period according to an embodiment of the present disclosure.

The self-scan period of FIG. 8 is an example of the self-scan period SS of FIGS. 3-6. During the self-scan period of FIG. 8, the first emission signal EMis, the second emission signal EMBis, and the second scan signal GIis may have the same waveform as the signals of the address scan period of FIG. 7. However, the first scan signal GWis and the third scan signal GRis may maintain a turn-off level. Accordingly, the first node N1 is in a floating state, and a voltage difference between both ends of the first capacitor Cst may be maintained. Accordingly, the luminance of the light-emitting element LD after the self-scan period in FIG. 8 may be the same as the luminance after the immediately preceding address scan period.

Figure 9:
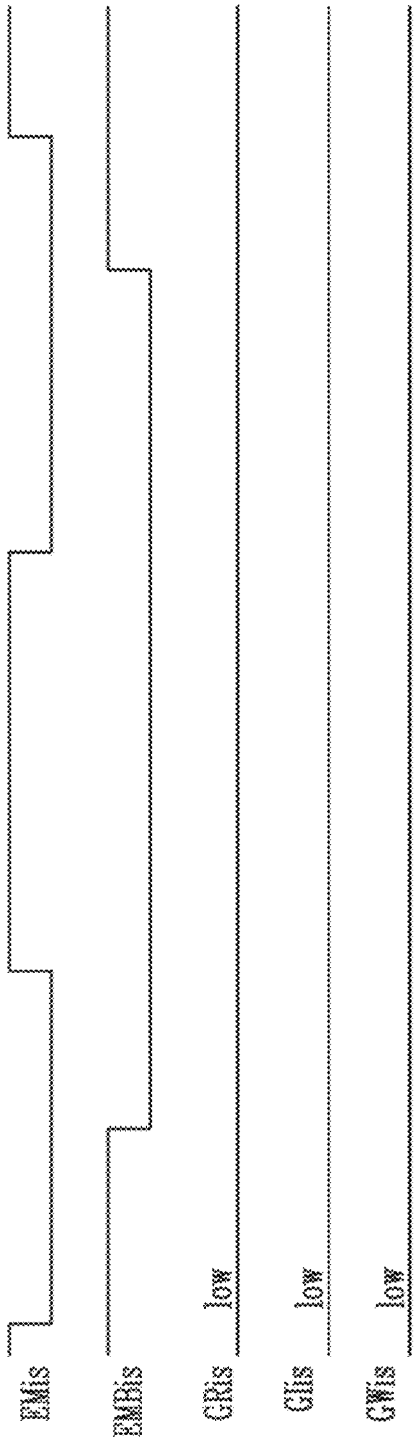
FIG. 9 is a diagram illustrating an auxiliary scan period according to an embodiment of the present disclosure.

FIG. 9 is a diagram illustrating an auxiliary scan period according to an embodiment of the present disclosure.

Figure 5:
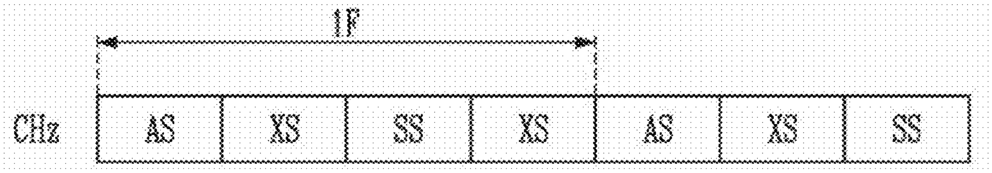
Figure 6:
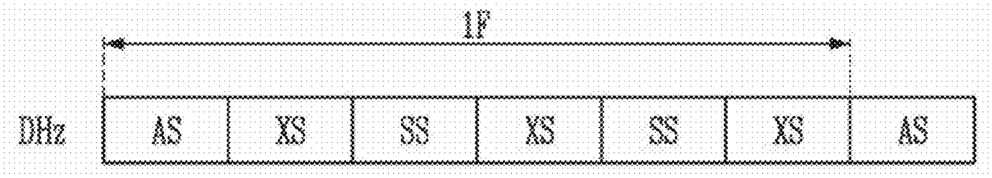

The auxiliary scan period of FIG. 9 is an example of the auxiliary scan period XS of FIGS. 5 and 6. During the auxiliary scan period of FIG. 9, the first emission signal EMis and the second emission signal EMBis may have the same waveform as the signals of the address scan period in FIG. 7. However, the first scan signal GWis, the second scan signal GIis, and the third scan signal GRis may maintain a turn-off level. Accordingly, the first node N1 is in a floating state, and a voltage difference between both ends of the first capacitor Cst may be maintained. Accordingly, the luminance of the light-emitting element LD after the auxiliary scan period of FIG. 9 may be the same as the luminance after the immediately preceding address scan period.

Figure 10:
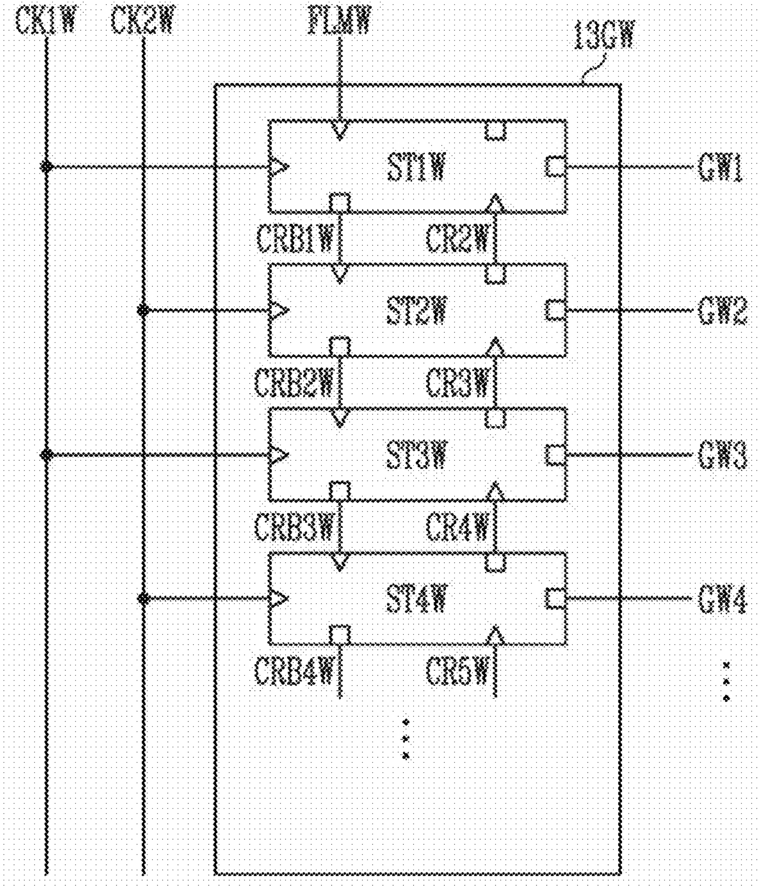
FIG. 10 is a diagram illustrating a first scan driver according to an embodiment of the present disclosure.

FIG. 10 is a diagram illustrating a first scan driver according to an embodiment of the present disclosure.

Referring to FIG. 10, a first scan driver 13GW according to an embodiment of the present disclosure may include scan stages ST1W, ST2W, ST3W, ST4W, . . . . The scan stages ST1W, ST2W, ST3W, ST4W, . . . may provide first scan signals to the first scan lines GW1, GW2, GW3, GW4, . . . .

The odd-numbered scan stages ST1W, ST3W, . . . may receive a first clock signal CK1W, and the even-numbered scan stages ST2W, ST4W, . . . may receive a second clock signal CK2W.

Each of the scan stages ST1W to ST4W, . . . may receive a previous first carry signal from a previous scan stage. For example, the scan stage ST2W may receive a previous first carry signal CRB1W from the scan stage ST1W. Similarly, the scan stage ST3W may receive a previous first carry signal CRB2W from the scan stage ST2W. The scan stage ST4W may receive a previous first carry signal CRB3W from the scan stage ST3W. However, since the initial scan stage ST1W does not have a previous scan stage, the first scan start signal FLMW may be received instead of the previous first carry signal. The first scan start signal FLMW may be provided by the timing controller 11.

In addition, each of the scan stages ST1W to ST4W, . . . may receive a next second carry signal from a next scan stage. For example, the scan stage ST1W may receive a next second carry signal CR2W from the next scan stage ST2W. Similarly, the scan stage ST2W may receive a next second carry signal CR3W from the next scan stage ST3W. The scan stage ST3W may receive a next second carry signal CR4W from the next scan stage ST4W. The scan stage ST4W may receive a next second carry signal CR5W from the next scan stage.

FIG. 10 illustrates an embodiment of a first scan driver 13GW included in the display device. The first scan driver 13GW includes a plurality of scan stages ST1W, ST2W, ST3W, ST4W, . . . , each configured to output a respective scan signal GW1, GW2, GW3, GW4, . . . to corresponding first scan lines. The scan stages operate in a cascaded manner to sequentially activate pixel rows for image display.

In an embodiment, the scan driver alternates the clock signals provided to the scan stages: odd-numbered stages (e.g., ST1W, ST3W) receive a first clock signal CK1W, while even-numbered stages (e.g., ST2W, ST4W) receive a second clock signal CK2W. These two clock signals may be phase-shifted to improve signal propagation and power efficiency during scan signal generation.

Each scan stage may receive a previous first carry signal from its immediate predecessor. This carry signal may help to determine whether the scan stage should activate its output line. For example, ST2W may receive CRB1W from ST1W, ST3W may receive CRB2W from ST2W, and so on. The first scan stage ST1W, which has no predecessor, instead receives a first scan start signal FLMW from the timing controller to initiate scan signal propagation.

Additionally, each scan stage also receives a next second carry signal from its immediate successor. For example, ST1W may receive CR2W from ST2W, ST2W may receive CR3W from ST3W, and so on. This bi-directional signal exchange may allow each scan stage to respond not only to upstream activation (from the previous stage) but also to downstream feedback (from the next stage), which may be used for, e.g., node voltage control, error suppression, or precise timing alignment.

Together, this architecture may allow the scan driver to sequentially propagate scan signals through the chain of scan stages while improving timing and reducing power consumption. The use of alternating clock signals, paired carry signals, and a well-coordinated start signal may provide robust and efficient scan control suitable for high-resolution and high-refresh-rate display applications.

Figure 11:
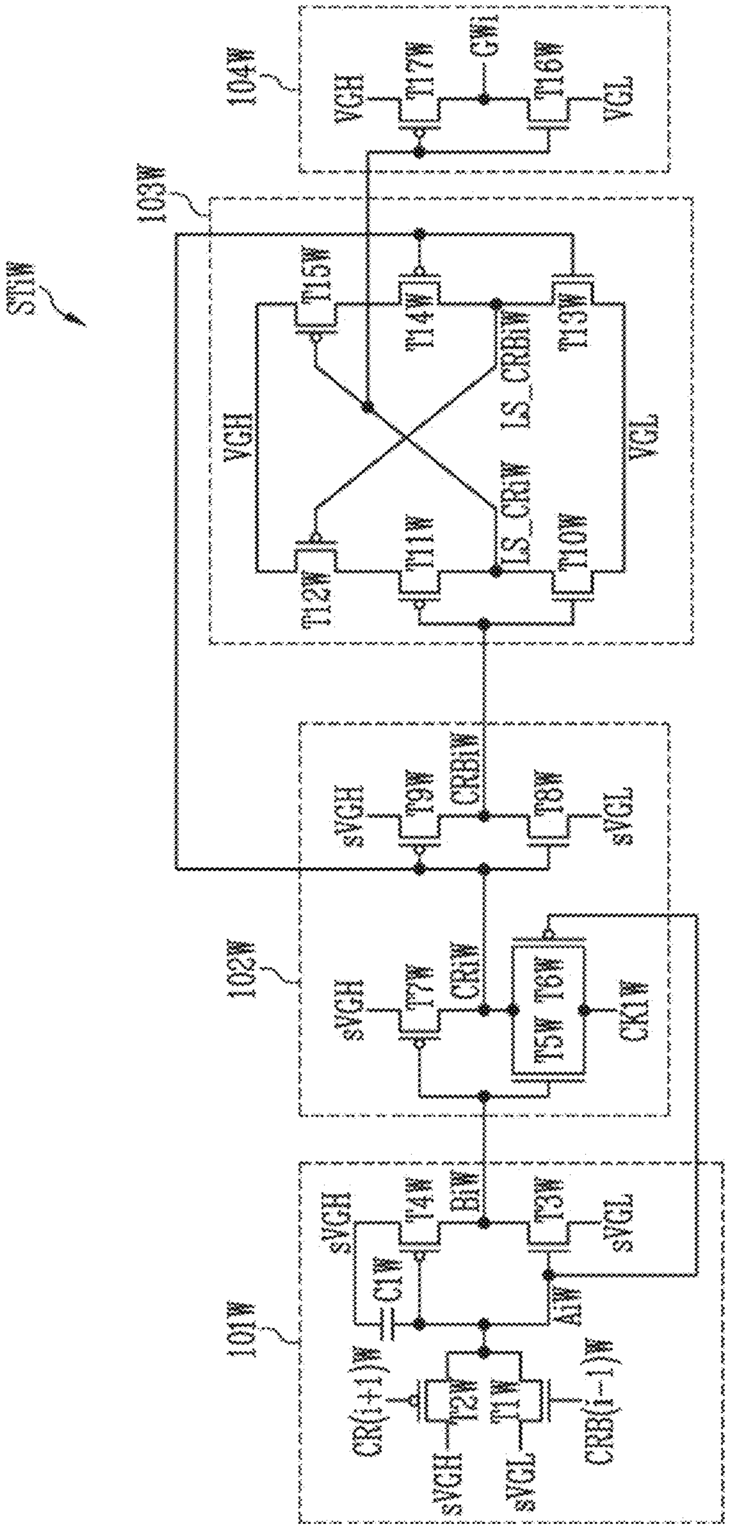
FIG. 11 is a diagram illustrating a scan stage according to an embodiment of the present disclosure.

FIG. 11 is a diagram illustrating a scan stage according to an embodiment of the present disclosure.

Referring to FIG. 11, an i-th scan stage STiW included in the first scan driver 13GW is shown as an example. The scan stage STiW may include a first node voltage setting unit 101W (also referred to as a first node voltage setting circuit), a carry signal providing unit 102W (also referred to as a carry signal providing circuit), an amplification unit 103W (also referred to as an amplification circuit), and a scan signal providing unit 104W (also referred to as a scan signal providing circuit). i may be an integer greater than 1.

The first node voltage setting unit 101W may set the voltage of the first node AiW based on the previous first carry signal CRB(i−1)W received from the previous scan stage (e.g., the i−1-th scan stage). However, since there is no previous scan stage in the case of the initial scan stage, the first scan start signal FLMW may be received instead of the previous first carry signal CRB(i−1)W. In addition, the first node voltage setting unit 101W may further receive the next second carry signal CR(i+1)W from the next scan stage (e.g., the (i+1)-th scan stage) and set the voltage of the first node AiW further based on the next second carry signal CR(i+1) W.

For example, according to an embodiment, the first node voltage setting unit 101W may control the voltage at the first node AiW by referencing the previous first carry signal CRB(i−1)W, which is output from the immediately preceding scan stage (such as the (i−1)-th stage). For the initial scan stage, where no preceding stage exists, the first node voltage setting unit 101W may instead utilize the first scan start signal FLMW as a substitute for CRB(i−1)W. Furthermore, the voltage setting behavior of the first node voltage setting unit 101W may also be influenced by a next second carry signal CR(i+1)W, which originates from the subsequent scan stage (e.g., the (i+1)-th stage). The first node voltage setting unit 101W may adjust the voltage at node AiW by taking into account both the prior carry signal and the upcoming one, which may improve signal control stability and timing consistency within the scan chain.

The first node voltage setting unit 101W may include transistors T1W, T2W, T3W, and T4W and a capacitor C1W. The transistors T1W and T3W may be N-type transistors, and the transistors T2W and T4W may be P-type transistors.

In the transistor T1W, a first electrode may receive a first low voltage sVGL, a second electrode may be connected to the first node AiW, and a gate electrode may receive the previous first carry signal CRB(i−1)W.

In the transistor T2W, a first electrode may receive a first high voltage sVGH, a second electrode may be connected to the first node AiW, and a gate electrode may receive the next second carry signal CR(i+1)W.

In the transistor T3W, a first electrode may receive the first low voltage sVGL, a second electrode may be connected to the second node BiW, and a gate electrode may be connected with the first node AiW.

The transistor T4W may have a first electrode connected to the second node BiW, a second electrode receiving the first high voltage sVGH, and a gate electrode connected to the first node AiW.

The capacitor C1W may be connected between the gate electrode and the second electrode of the transistor T4W.

The carry signal providing unit 102W may generate a first carry signal CRBiW based on the voltage of the first node AiW and the first clock signal CK1W. For example, the carry signal providing unit 102W may first generate the second carry signal CRiW based on the voltage of the first node AiW and the first clock signal CK1W. Next, the carry signal providing unit 102W may invert the second carry signal CRiW to generate the first carry signal CRBiW.

For example, according to an embodiment, the carry signal providing unit 102W may be configured to generate the first carry signal CRBiW by utilizing both the voltage present at the first node AiW and the first clock signal CK1W. For example, the carry signal providing unit 102W may initially derive a second carry signal CRiW as a function of the first node voltage and the incoming clock signal. This second carry signal CRiW reflects an intermediate logic level or control state within the scan stage. The carry signal providing unit 102W may then invert this second carry signal CRiW to produce the first carry signal CRBiW, which is used for propagating scan activation to the subsequent stage. By separating the generation and inversion processes, the architecture may enable more precise logic control and signal shaping, contributing to stable scan operation and improved timing synchronization across the scan driver chain.

The carry signal providing unit 102W may include transistors T5W, T6W, T7W, T8W, and T9W. The transistors T5W and T8W may be N-type transistors, and the transistors T6W, T7W, and T9W may be P-type transistors.

In the transistor T5W, a first electrode may receive the first clock signal CK1W, and a gate electrode may be connected to the second node BiW. In the transistor T6W, a first electrode may receive the first clock signal CK1W, and a gate electrode may be connected to the first node AiW. The transistors T5W and T6W may be referred to as clock input transistors. In an embodiment, a channel of the clock input transistor may directly receive the clock signal CK1W, rather than the gate electrode of the clock input transistor. Accordingly, power consumption due to unnecessary charging and discharging of parasitic capacitance generated when the gate electrode of the clock input transistor receives the clock signal may be reduced.

A first electrode of the transistor T7W may be connected to second electrodes of the transistors T5W and T6W, the second electrode may receive the first high voltage sVGH, and the gate electrode may be connected to the second node BiW. Under the control of the first node AiW and the second node BiW, the transistors T5W, T6W, T7W may generate the second carry signal CRiW at the inter-node.

In the transistor T8W, a first electrode may receive the first low voltage sVGL, and a gate electrode may receive the second carry signal CRiW. In the transistor T9W, a first electrode may be connected to a second electrode of the transistor T8W, a second electrode may receive the first high voltage sVGH, and a gate electrode may receive the second carry signal CRiW. The transistors T8W and T9W may generate a first carry signal CRBiW at a node therebetween.

The amplification unit 103W may generate a first amplified signal LS_CRiW based on the first carry signal CRBiW. The amplification unit 103W may generate the first amplified signal LS_CRiW further based on the second carry signal CRiW. The first amplified signal LS_CRiW may have a second high voltage VGH as a first voltage level and a second low voltage VGL as a second voltage level. The second high voltage VGH may have a higher voltage level than the first high voltage sVGH. The second low voltage VGL may have a voltage level lower than that of the first low voltage sVGL.

The amplification unit 103W may include transistors T10W, T11W, T12W, T13W, T14W, and T15W. The transistors T10W and T13W may be N-type transistors, and the transistors T11W, T12W, T14W, and T15W may be P-type transistors.

In the transistor T10W, a first electrode may receive the second low voltage VGL, and a gate electrode may receive the first carry signal CRBiW. In the transistor T11W, a first electrode may be connected to a second electrode of the transistor T10W, and a gate electrode may receive the first carry signal CRBiW. The transistors T10W and T11W may generate the first amplified signal LS_CRiW at a node therebetween. The transistor T12W may have a first electrode connected to a second electrode of the transistor T11W, a second electrode receiving the second high voltage VGH, and a gate electrode connected to a node between the transistors T13W and T14W.

In the transistor T13W, a first electrode receives the second low voltage VGL, and a gate electrode receives the second carry signal CRiW. In the transistor T14W, a first electrode may be connected to a second electrode of the transistor T13W, and a gate electrode may receive the second carry signal CRiW. The transistors T13W and T14W may generate the second amplified signal LS_CRBiW at a node therebetween. The transistor T15W may have a first electrode connected to a second electrode of the transistor T14W, a second electrode receiving the second high voltage VGH, and a gate electrode connected to a node between the transistors T10W and T11W.

The scan signal providing unit 104W may generate a scan signal based on the first amplified signal LS_CRiW. The scan signal providing unit 104W may include transistors T16W and T17W. The transistor T16W may be an N-type transistor, and the transistor T17W may be a P-type transistor.

A first electrode of the transistor T16W may receive the second low voltage VGL, a second electrode of the transistor T16W may be connected to the i-th first scan line GWi, and a gate electrode of the transistor T16W may receive the first amplified signal LS_CRiW. A first electrode of the transistor T17W may be connected to the i-th first scan line GWi, a second electrode of the transistor T17W may receive the second high voltage VGH, and a gate electrode of the transistor T17W may receive the first amplified signal LS_CRiW.

In an embodiment, to change the polarity of the first scan signal, the scan signal providing unit 104W may generate a scan signal based on the second amplified signal LS_CRBiW. In this case, the gate electrodes of the transistors T16W and T17W will receive the second amplified signal LS_CRBiW.

According to embodiments of the present disclosure, referring to FIG. 11, a scan stage STiW may be configured to generate and propagate scan signals using a modular structure composed of a first node voltage setting unit 101W, a carry signal providing unit 102W, an amplification unit 103W, and a scan signal providing unit 104W. The first node voltage setting unit 101W adjusts the voltage of the first node AiW based on both a previous first carry signal CRB(i−1)W and a next second carry signal CR(i+1)W, which may improve timing accuracy and signal stability.

The carry signal providing unit 102W may generate a second carry signal CRiW from the node voltage and the first clock signal CK1W, and then invert it to produce the first carry signal CRBiW, which is used to activate the next stage. The carry signal providing unit 102W may reduce power consumption by directly applying the clock signal to the channel of clock input transistors T5W and T6W. The amplification unit 103W may amplify the carry signal to a first amplified signal LS_CRiW, and the scan signal providing unit 104W may use this to output a scan signal to the corresponding scan line GWi, with polarity control using LS_CRBiW.

Figure 12:
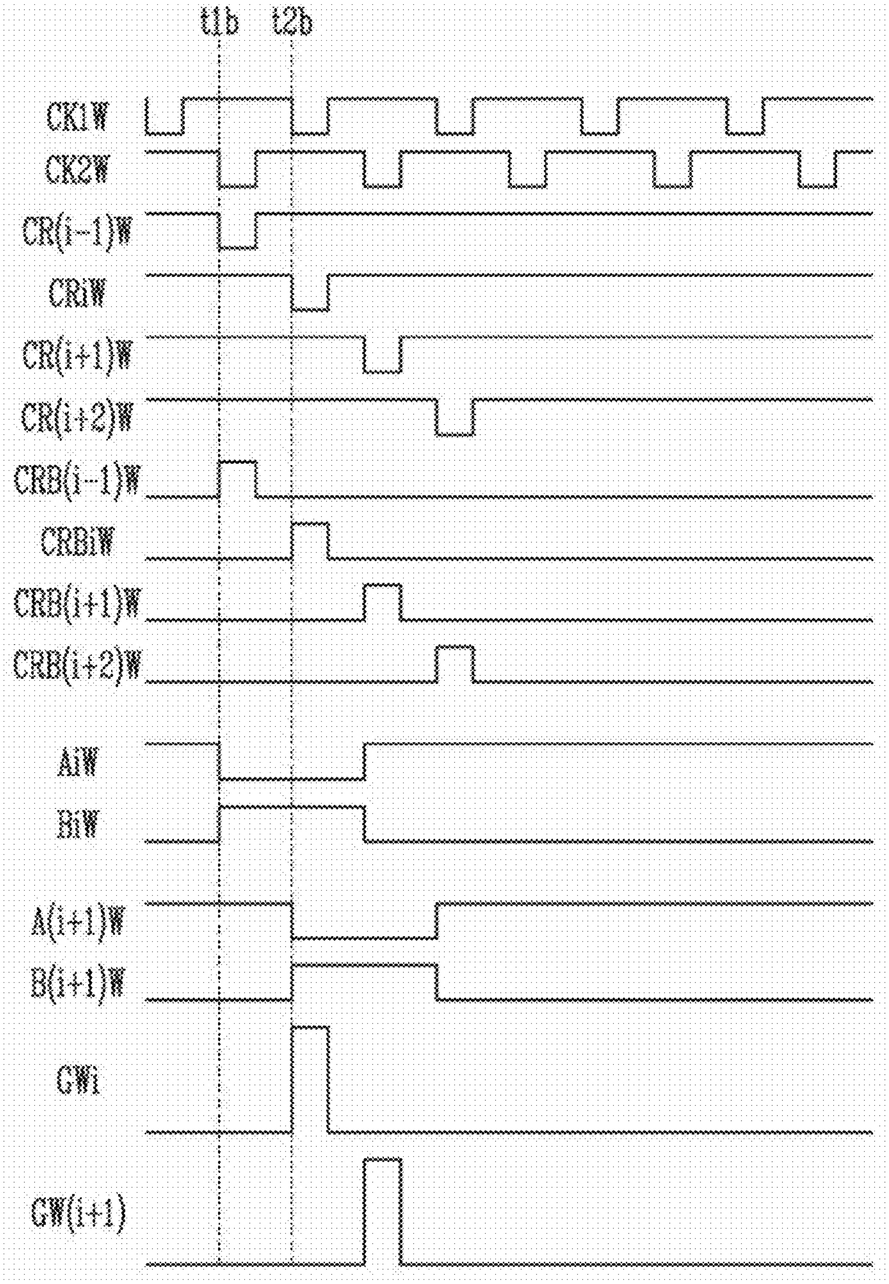
FIG. 12 is a diagram illustrating a driving method of the first scan driver of FIG. 10.

FIG. 12 is a diagram illustrating a driving method of the first scan driver of FIG. 10.

Referring to FIG. 12, the first clock signal CK1W, the second clock signal CK2W, second carry signals CR(i−1)W, CRiW, CR(i+1)W, and CR(i+2)W output from (i−1)-th to (i+2)-th scan stages, first carry signals CRB(i−1) W, CRBiW, CRB(i+1)W, and CRB(i+2)W output from (i−1)-th and (i+2)-th scan stages, a voltage of the first node AiW and a voltage of the second node BiW of the i-th scan stage STiW, a voltage of the first node A(i+1) w and a voltage of the second node B(i+1)w of the (i+1)-th scan stage, a first scan signal applied to the i-th first scan line GWi, and a first scan signal applied to the (i+1)-th first scan line GW(i+1) are shown as an example.

The first clock signal CK1W and the second clock signal CK2W may be signals having the same waveform but different phases by about 180 degrees.

When the previous first carry signal CRB(i−1)W at the turn-on level (high level) is received at the time point t1*b*, the transistor T1W is turned on. Accordingly, the voltage of the first node AiW is set to the first low voltage sVGL. Accordingly, the voltage of the second node BiW is set to the first high voltage sVGH. Thus, the transistors T5W and T6W are turned on, and the transistor T7W is turned off.

At time point t2*b*, the first clock signal CK1W at a turn-on level (low level) may be received via transistors T5W, T6W. Accordingly, the second carry signal CRiW may be set to a low level, and the first carry signal CRBiW may be set to a high level. Accordingly, the first amplified signal LS_CRiW may be set to the second low voltage VGL. Thus, the transistor T17W may be turned on, and a second high voltage VGH may be applied to the i-th first scan line GWi.

Figure 13:
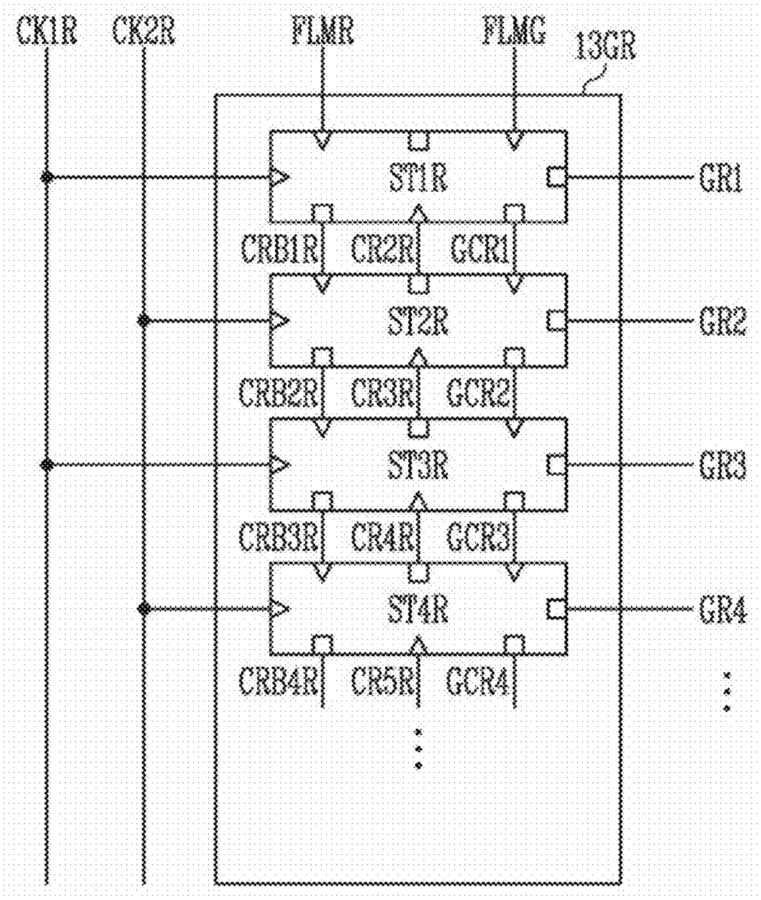
FIG. 13 is a diagram illustrating a third scan driver according to an embodiment of the present disclosure.

FIG. 13 is a diagram illustrating a third scan driver according to an embodiment of the present disclosure.

Referring to FIG. 13, a third scan driver 13GR according to an embodiment of the present disclosure may include scan stages ST1R, ST2R, ST3R, ST4R, . . . . The scan stages ST1R, ST2R, ST3R, ST4R, . . . may provide third scan signals to the third scan lines GR1, GR2, GR3, GR4, . . . .

The odd-numbered scan stages ST1R, ST3R, . . . may receive a first clock signal CK1R, and the even-numbered scan stage ST2R, ST4R, . . . may receive a second clock signal CK2R.

Each of the scan stages ST1R to ST4R, . . . may receive a previous first carry signal from a previous scan stage. For example, the scan stage ST2R may receive the previous first carry signal CRB1R from the scan stage ST1R. Similarly, the scan stage ST3R may receive the previous first carry signal CRB2R from the scan stage ST2R. The scan stage ST4R may receive the previous first carry signal CRB3R from the scan stage ST3R. However, since the initial scan stage ST1R does not have a previous scan stage, the third scan start signal FLMR may be received instead of the previous first carry signal. The third scan start signal FLMR may be provided by the timing controller 11.

In addition, each of the scan stages ST1R to ST4R, . . . may receive a next second carry signal from a next scan stage. For example, the scan stage ST1R may receive the next second carry signal CR2R from the next scan stage ST2R. Similarly, the scan stage ST2R may receive a next second carry signal CR3R from the next scan stage ST3R. The scan stage ST3R may receive a next second carry signal CR4R from the next scan stage ST4R. The scan stage ST4R may receive a next second carry signal CR5R from the next scan stage.

In addition, each of the scan stages ST1R to ST4R, . . . may receive a previous third carry signal from a previous scan stage. For example, the scan stage ST2R may receive the previous third carry signal GCR1 from the scan stage ST1R. Similarly, the scan stage ST3R may receive the previous third carry signal GCR2 from the scan stage ST2R. The scan stage ST4R may receive the previous third carry signal GCR3 from the scan stage ST3R. However, since the initial scan stage ST1R does not have a previous scan stage, a width adjustment signal FLMG may be received instead of the previous third carry signal. The width adjustment signal FLMG may be provided by the timing controller 11.

For example, according embodiments of the present disclosure, referring to FIG. 13, a third scan driver 13GR is configured to output third scan signals to corresponding third scan lines GR1, GR2, GR3, GR4, and so on. The third scan driver 13GR includes multiple scan stages ST1R, ST2R, ST3R, ST4R, . . . , which operate in a sequential manner to propagate scan signals across the panel.

Odd-numbered scan stages (e.g., ST1R, ST3R) may receive a first clock signal CK1R, while even-numbered stages (e.g., ST2R, ST4R) may receive a second clock signal CK2R. Each scan stage may receive a previous first carry signal (e.g., CRB1R, CRB2R) from the preceding stage, except for the first stage ST1R, which may receive a third scan start signal FLMR from the timing controller. In addition, each scan stage may receive a next second carry signal (e.g., CR2R, CR3R) from the following stage, enabling bi-directional coordination of scan progression.

Furthermore, each stage may receive a previous third carry signal (e.g., GCR1, GCR2) from the preceding stage to support width control of the scan pulse. The first scan stage ST1R, which lacks a preceding stage, may receive a width adjustment signal FLMG from the timing controller instead. This combination of directional carry signals and clock phasing may allow for precise timing, synchronization, and width control for robust and energy-efficient scan signal generation.

Figure 14:
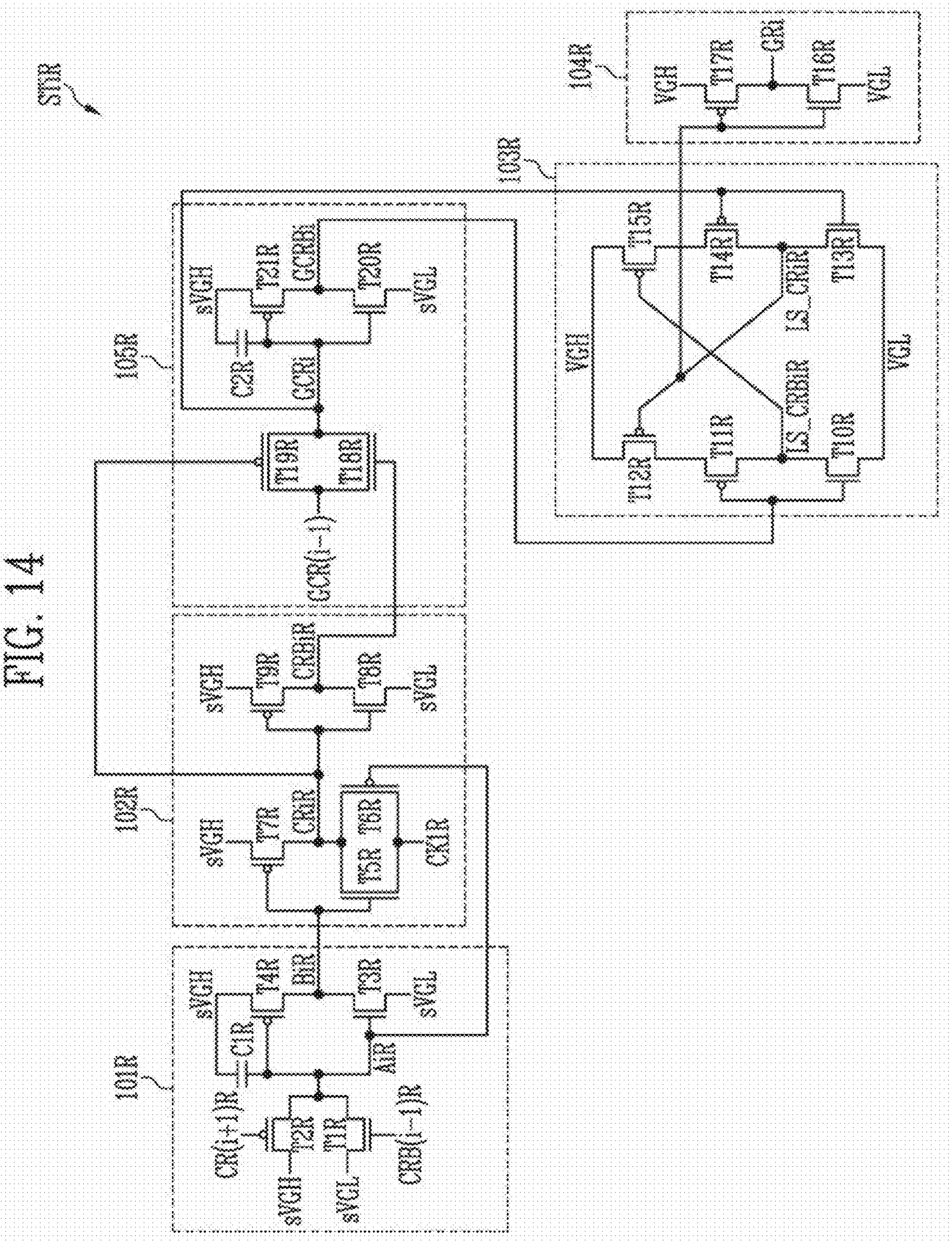
FIG. 14 is a diagram illustrating a scan stage according to an embodiment of the present disclosure.

FIG. 14 is a diagram illustrating a scan stage according to an embodiment of the present disclosure.

Referring to FIG. 14, an i-th scan stage STiR included in the third scan driver 13GR is shown as an example. The scan stage STiR may include a first node voltage setting unit 101R (also referred to as a first node voltage setting circuit), a carry signal providing unit 102R (also referred to as a carry signal providing circuit), a width determining unit 105R (also referred to as a width determining circuit), an amplification unit 103R (also referred to as an amplification circuit), and a scan signal providing unit 104R (also referred to as a scan signal providing circuit). i may be an integer greater than 1.

The first node voltage setting unit 101R may set the voltage of the first node AiR based on the previous first carry signal CRB(i−1)R received from the previous scan stage (for example, the (i−1)-th scan stage). However, the initial scan stage may receive the third scan start signal FLMR instead of the previous first carry signal. In addition, the first node voltage setting unit 101R may further receive the next second carry signal CR(i+1)R from the next scan stage (e.g., the (i+1)-th scan stage) and set the voltage of the first node AiR further based on the next second carry signal CR(i+1)R.

The first node voltage setting unit 101R may include transistors T1R, T2R, T3R, and T4R and a capacitor C1R. The transistors T1R and T3R may be N-type transistors, and the transistors T2R and T4R may be P-type transistors.

In the transistor T1R, a first electrode may receive the first low voltage sVGL, a second electrode may be connected to the first node AiR, and a gate electrode may receive the previous first carry signal CRB(i−1)R.

In the transistor T2R, a first electrode may receive the first high voltage sVGH, a second electrode may be connected to the first node AiR, and a gate electrode may receive the next second carry signal CR (i+1)R.

In the transistor T3R, a first electrode may receive the first low voltage sVGL, a second electrode may be connected to the second node BiR, and a gate electrode may be connected with the first node AiR.

The transistor T4R may have a first electrode connected to the second node BiR, a second electrode receiving the first high voltage sVGH, and a gate electrode connected to the first node AiR.

The capacitor C1R may be connected between the gate electrode and the second electrode of the transistor T4R.

The carry signal providing unit 102R may generate the first carry signal CRBiR based on the voltage of the first node AiR and the first clock signal CK1R. For example, the carry signal providing unit 102R may first generate the second carry signal CRiR based on the voltage of the first node AiR and the first clock signal CK1R. Next, the carry signal providing unit 102R may invert the second carry signal CRiR to generate the first carry signal CRBiR.

The carry signal providing unit 102R may include transistors T5R, T6R, T7R, T8R, and T9R. Transistors T5R and T8R may be N-type transistors, and transistors T6R, T7R, and T9R may be P-type transistors.

In the transistor T5R, a first electrode may receive the first clock signal CK1R, and a gate electrode may be connected to the second node BiR. In the transistor T6R, a first electrode may receive the first clock signal CK1R, and a gate electrode may be connected to the first node AiR. Transistors T5R and T6R may be referred to as clock input transistors. In an embodiment, a channel of the clock input transistor, not the gate electrode of the clock input transistor, may directly receive the clock signal. Accordingly, power consumption due to unnecessary charging and discharging of parasitic capacitance generated when the gate electrode of the clock input transistor receives the clock signal may be reduced.

A first electrode of the transistor T7R may be connected to second electrodes of the transistors T5R and T6R, a second electrode of the transistor T7R may receive the first high voltage sVGH, and a gate electrode of the transistor T7R may be connected to the second node BiR. Under the control of the first node AiR and the second node BiR, the transistors T5R, T6R, T7R may generate the second carry signal CRiR at a node therebetween.

In the transistor T8R, a first electrode may receive the first low voltage sVGL, and a gate electrode may receive the second carry signal CRiR. In the transistor T9R, a first electrode may be connected to a second electrode of the transistor T8R, a second electrode may receive the first high voltage sVGH, and a gate electrode may receive the second carry signal CRiR. The transistors T8R and T9R may generate a first carry signal CRBiR at a node therebetween.

The width determining unit 105R may generate a third carry signal GCRi that determines the width of the scan signal, based on the previous third carry signal GCR(i−1) and the first carry signal CRBiR. However, the initial scan stage may receive the width adjustment signal FLMG instead of the previous third carry signal GCR(i−1). In addition, the width determining unit 105R may invert the third carry signal GCRi to generate a fourth carry signal GCRBi.

The width determining unit 105R may include transistors T18R, T19R, T20R, and T21R and a capacitor C2R. The transistors T18R and T20R may be N-type transistors, and the transistors T19R and T21R may be P-type transistors.

In the transistor T18R, a first electrode may receive the previous third carry signal GCR(i−1), and a gate electrode may receive the first carry signal CRBiR. In the transistor T19R, a first electrode may receive the previous third carry signal GCR(i−1), and a gate electrode may receive the second carry signal CRiR. The second electrodes of the transistors T18R and T19R are connected to each other and may generate a third carry signal GCRi.

In the transistor T20R, a first electrode may receive the first low voltage sVGL, and a gate electrode may receive the third carry signal GCRi. In the transistor T21R, a first electrode may be connected to a second electrode of the transistor T20R, a second electrode may receive the first high voltage sVGH, and a gate electrode may receive the third carry signal GCRi. The capacitor C2R may be connected between the gate electrode and the second electrode of the transistor T21R. The transistors T20R and T21R may generate a fourth carry signal GCRBi at a node therebetween. The fourth carry signal GCRBi may be an inverted signal of the third carry signal GCRi.

The amplification unit 103R may generate the first amplified signal LS_CRiR based on the third carry signal GCRi. The amplification unit 103R may generate the first amplified signal LS_CRiR further based on the fourth carry signal GCRBi. The first amplified signal LS_CRiR may have a second high voltage VGH as a first voltage level and a second low voltage VGL as a second voltage level. The second high voltage VGH may have a higher voltage level than the first high voltage sVGH. The second low voltage VGL may have a voltage level lower than that of the first low voltage sVGL.

The amplification unit 103R may include transistors T10R, T11R, T12R, T13R, T14R, and T15R. The transistors T10R and T13R may be N-type transistors, and the transistors T11R, T12R, T14R, and T15R may be P-type transistors.

In the transistor T10R, a first electrode may receive the second low voltage VGL, and a gate electrode may receive the fourth carry signal GCRBi. In the transistor T11R, a first electrode may be connected to a second electrode of the transistor T10R, and a gate electrode may receive the fourth carry signal GCRBi. The transistors T10R and T11R may generate the second amplified signal LS_CRBiR at a node therebetween. The transistor T12R may have a first electrode connected to a second electrode of the transistor T11R, a second electrode receiving the second high voltage VGH, and a gate electrode connected to a node between the transistors T13R and T14R.

In the transistor T13R, a first electrode may receive the second low voltage VGL, and a gate electrode may receive the third carry signal GCRi. In the transistor T14R, a first electrode may be connected to a second electrode of the transistor T13R, and a gate electrode may receive the third carry signal GCRi. The transistors T13R and T14R may generate the first amplified signal LS_CRiR at an intermediate node. The transistor T15R may have a first electrode connected to a second electrode of the transistor T14R, a second electrode receiving the second high voltage VGH, and a gate electrode connected to a node between the transistors T10R and T11R.

The scan signal providing unit 104R may generate a scan signal based on the first amplified signal LS_CRiR. The scan signal providing unit 104R may include transistors T16R and T17R. The transistor T16R may be an N-type transistor, and the transistor T17R may be a P-type transistor.

A first electrode of the transistor T16R may receive the second low voltage VGL, a second electrode of the transistor T16R may be connected to the i-th third scan line GRi, and a gate electrode of the transistor T16R may receive the first amplified signal LS_CRiR. A first electrode of the transistor T17R may be connected to the i-th third scan line GRi, a second electrode of the transistor T17R may receive the second high voltage VGH, and a gate electrode of the transistor T17R may receive the first amplified signal LS_CRiR.

In an embodiment, to change the polarity of the third scan signal, the scan signal providing unit 104R may generate the third scan signal based on the second amplified signal LS_CRBiR. In this case, the gate electrodes of the transistors T16R and T17R will receive the second amplified signal LS_CRBiR.

For example, according to an embodiment, referring to FIG. 14, a scan stage STiR included in the third scan driver 13GR may generate and propagate scan signals using a modular structure that includes a first node voltage setting unit 101R, a carry signal providing unit 102R, a width determining unit 105R, an amplification unit 103R, and a scan signal providing unit 104R. The first node voltage setting unit 101R may set the voltage of the internal node AiR based on both a previous first carry signal CRB(i−1)R and a next second carry signal CR(i+1)R, which may improve signal stability and inter-stage timing coordination.

The carry signal providing unit 102R may generate a second carry signal CRiR based on the voltage of AiR and a first clock signal CK1R, and may then invert that signal to output a first carry signal CRBiR for activating the next scan stage. The carry signal providing unit 102R may include clock input transistors T5R and T6R, which are configured to receive the clock signal directly through their channels rather than their gates, which may reduce power consumption by limiting parasitic gate charging and discharging.

In an embodiment, the scan stage also includes a width determining unit 105R, which generates a third carry signal GCRi based on the previous third carry signal GCR(i−1) and the first carry signal CRBiR. The width determining unit 105R may further generate a fourth carry signal GCRBi, which is the inverted form of GCRi, allowing for control over the pulse width of the resulting scan signal.

The amplification unit 103R amplifies the carry signals to produce high-swing outputs, including LS_CRiR and LS_CRBiR, based on GCRi and GCRBi, respectively. These signals transition between a second high voltage VGH and a second low voltage VGL, which are elevated beyond the internal swing (sVGH, sVGL), and are suitable for robust scan line control. Finally, the scan signal providing unit 104R uses LS_CRiR to generate a scan signal on the i-th third scan line GRi, with the option to switch to LS_CRBiR for polarity control. Together, these components may enable precise, flexible, and energy-efficient scan signal generation within the third scan driver architecture.

Figure 15:
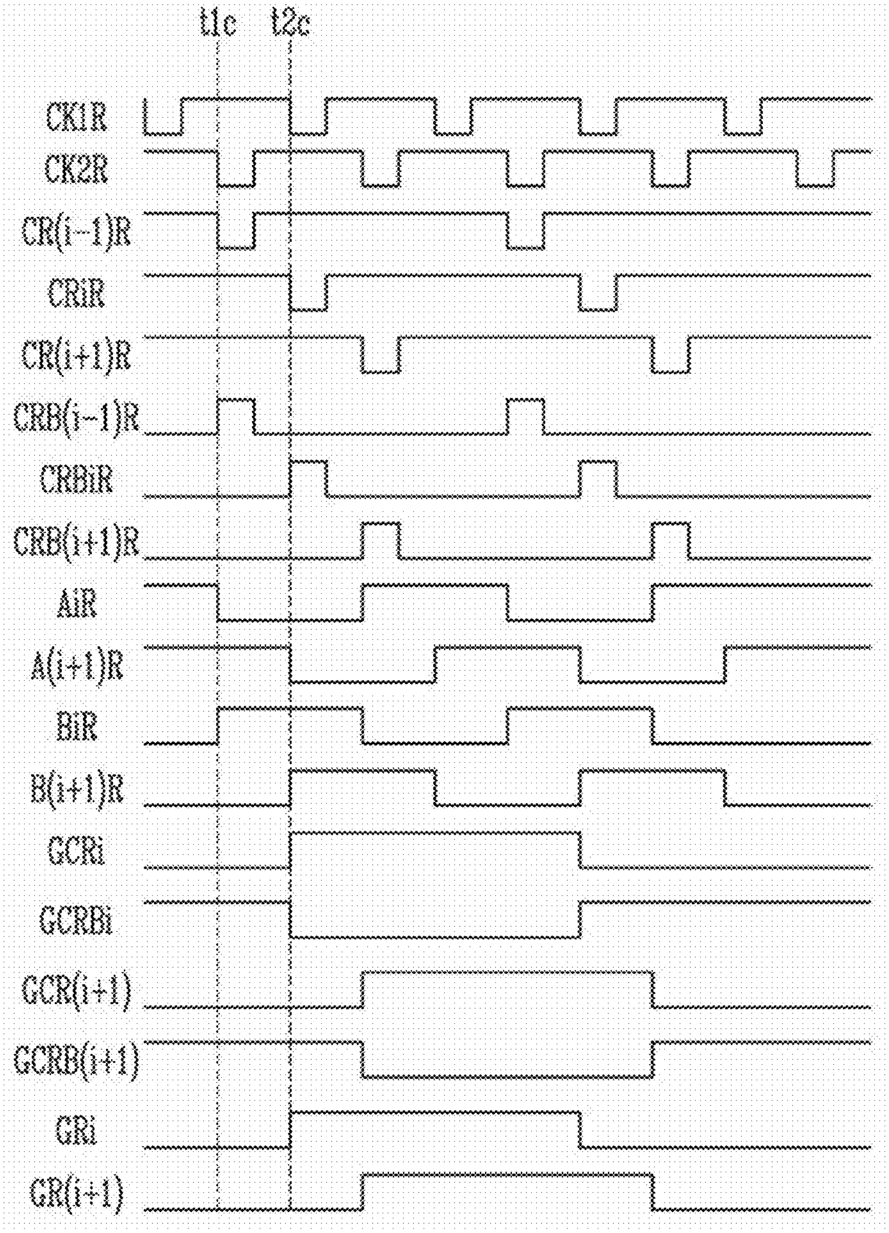
FIG. 15 is a diagram illustrating a driving method of a third scan driver of FIG. 10.

FIG. 15 is a diagram illustrating a driving method of the third scan driver of FIG. 10.

Referring to FIG. 15, the first clock signal CK1R, the second clock signal CK2R, second carry signals CR(i−1)R, CRiR, CR(i+1)R output from (i−1)-th to (i+1)-th scan stages, first carry signals CRB(i−1)R, CRBiR, CRB(i+1)R output from (i−1)-th to (i+1)-th scan stages, a voltage of the first node AiR and a voltage of the second node BiR of an i-th scan stage STiR, a voltage of a first node A(i+1)R and a voltage of a second node B(i+1)R of an (i+1)-th scan stage, a third scan signal applied to an i-th third scan line GRi, and a third scan signal applied to an (i+1)-th third scan line GR(i+1) are shown as an example. Also shown are the i-th third carry signal GCRi, the (i+1)-th third carry signals GCR(i+1), the i-th fourth carry signal GCRBi, and the (i+1)-th fourth carry signal GCRB(i+1).

The first clock signal CK1R and the second clock signal CK2R may be signals having the same waveform but different phases by 180 degrees.

When the previous first carry signal CRB(i−1)R at the turn-on level (high level) is received at the time point t1*c*, the transistor T1R is turned on. Accordingly, the voltage of the first node AiR is set to the first low voltage sVGL. Accordingly, the voltage of the second node BiR is set to the first high voltage sVGH. Thus, the transistors T5R and T6R are turned on, and the transistor T7R is turned off.

At time point t2*c*, the first clock signal CK1R at a turn-on level (low level) may be received via transistors T5R and T6R. Accordingly, the second carry signal CRiR may be set to a low level, and the first carry signal CRBiR may be set to a high level. Accordingly, the transistors T18R and T19R are turned on. In this case, the (i−1)-th third carry signal GCR(i−1) may be at a high level. Thus, the i-th third carry signal GCRi may be at a high level. The fourth carry signal GCRBi is set to a low level. Accordingly, the first amplified signal LS_CRiR may be set to the second low voltage VGL. Thus, the transistor T17R may be turned on and the second high voltage VGH may be applied to the i-th third scan line GRi.

Figure 16:
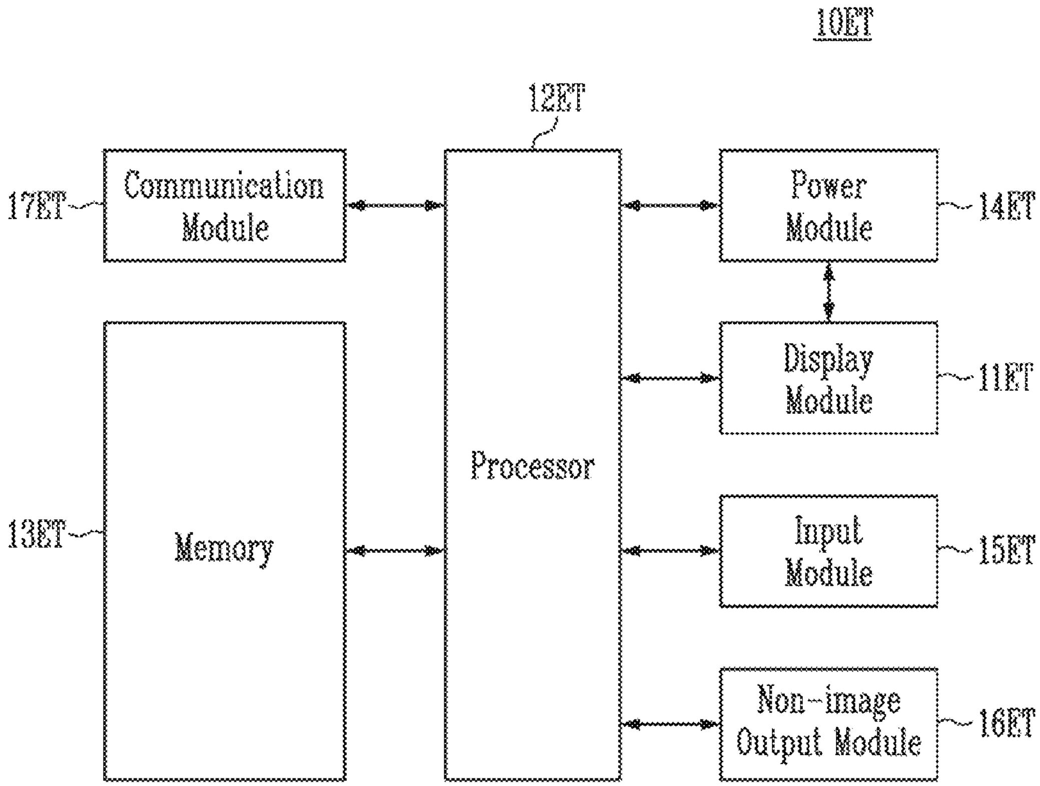
FIG. 16 is a block diagram of an electronic device according to an embodiment of the present disclosure.

FIG. 16 is a block diagram of an electronic device according to an embodiment.

Referring to FIG. 16, an electronic device 10ET according to an embodiment may include a display module 11ET, a processor 12ET, a memory 13ET, and a power module 14ET. The display module 11ET may be represented by a display device.

The processor 12ET may include at least one of, for example, a central processing unit (CPU), an application processor (AP), a graphics processing unit (GPU), a communication processor (CP), an image signal processor (ISP), and a controller. In one embodiment, the processor 12ET may be provided divided into two or more from a functional or structural point of view. For example, the processor 12ET may include a main processor in the form of a first drive chip including a central processing unit, and an auxiliary processor in the form of the second drive chip including a controller that receives an image signal from the main processor and processes the image signal to meet an interface specification of the display module 11ET. The processor 12ET may provide image data. The display module 11ET may display an image based on grayscales of image data.

The memory 13ET may include at least one of a non-volatile memory and a volatile memory. Data information necessary for the operation of the processor 12ET or the display module 11ET may be stored in the memory 13ET. When the processor 12ET executes an application stored in the memory 13ET, an image data signal and/or an input control signal are transmitted to the display module 11ET, and the display module 11ET may process the received signal and output image information through a display screen.

The power module 14ET may include a power supply module such as a power adapter or a battery device, and a power conversion module that converts power supplied by the power supply module to generate power required for operation of the electronic device 10ET. The power conversion by the power conversion module may include, but is not limited to, DC-DC conversion, AC-DC conversion, and DC-AC conversion.

The electronic device 10ET may further include an input module 15ET, a non-image output module 16ET, and/or a communication module 17ET.

The input module 15ET may provide input information to the processor 12ET and/or the display module 11ET. The input module 15ET may include physical buttons, keyboards, microphones, as well as various sensor modules. Examples of the sensor module may include a touch sensor, a pressure sensor, a distance sensor, a position sensor, a digitizer, a motion recognition sensor, a camera sensor, a light receiving sensor, a photoelectric conversion sensor, a temperature sensor, as well as a biometric sensor such as a blood pressure sensor, a blood glucose sensor, an electrocardiogram sensor, a heart rate sensor, and the like.

The non-image output module 16ET may receive information other than the image received from the processor 12ET and provide it to the user. Examples of the non-image output module 16ET include an acoustic module, a haptic module, a light emitting module, and the like, and may include other functional modules unique to an electronic device (e.g., a cooling module of a refrigerator, and the like).

The communication module 17ET is a module that is responsible for transmitting and receiving information between the electronic device 10ET and an external device, and may include a receiving unit and a transmitting unit. The communication module 17ET may include various wireless communication modules such as a mobile communication module, a Wi-Fi module, and a Bluetooth module, or various wired communication modules.

At least one of the above-described components of the electronic device 10ET may be included in the display device according to the above-described embodiments. In addition, some of the individual modules functionally included in one module may be included in the display device, and other parts may be provided separately from the display device. For example, the display device may include a display module 11ET, and the processor 12ET, the memory 13ET, and the power module 14ET may be provided in the form of other devices in the electronic device 10ET other than the display device. As another example, the power module 14ET may be provided in the display device, and power may be supplied to the processor 12ET and the memory 13ET provided in the electronic device 10ET other than the display device, which is not limited to the above example.

Figure 17:
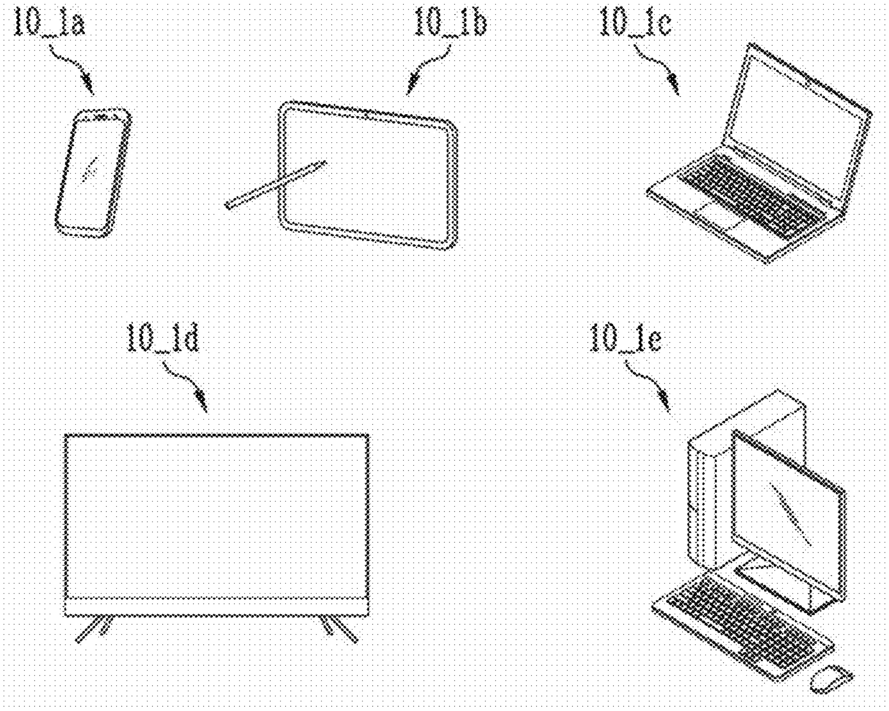
FIGS. 17 to 19 are schematic diagrams of an electronic device according to various embodiments of the present disclosure.
Figure 18:
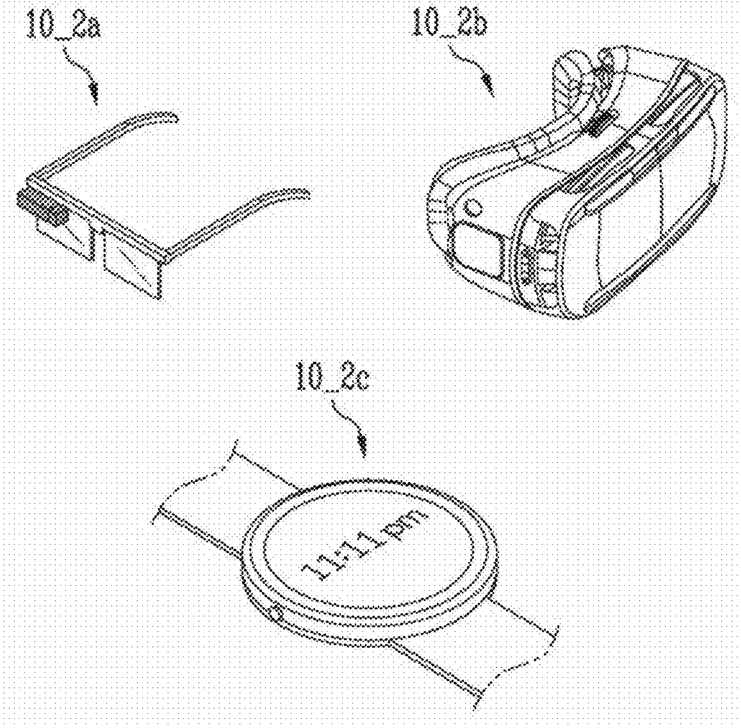
Figure 19:
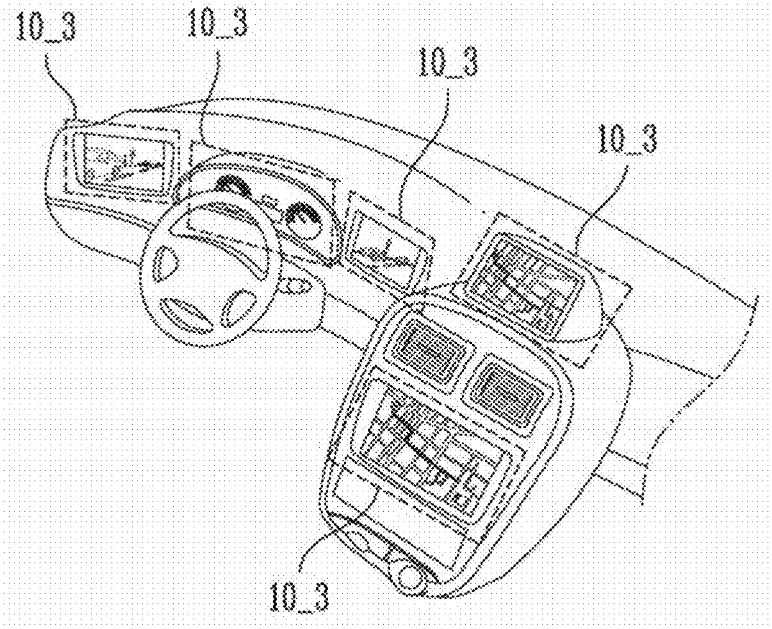

FIGS. 17 to 19 are schematic diagrams of an electronic device according to various embodiments. FIGS. 17 to 19 illustrate examples of various electronic devices to which a display device according to embodiments is applied.

FIG. 17 illustrates a smartphone 10_1*a*, a tablet PC 10_1*b*, a laptop 10_1*c*, a TV 10_1*d*, and a desk monitor 10_1*e* as examples of electronic devices.

The smartphone 10_1*a* may include an input module such as a touch sensor and a communication module in addition to the display module 11ET. The smartphone 10_1*a* may process information received through a communication module or other input module to display information through a display module of a display device.

The tablet PC 10_1*b*, laptop 10_1*c*, TV 10_1*d*, and desk monitor 10_1*e* also include a display module and an input module, similar to the smartphone 10_1*a*, and may further include a communication module in some cases.

FIG. 18 illustrates a case in which an electronic device including a display module is applied to a wearable electronic device. The wearable electronic device may be, for example, smart glasses 10_2*a*, a head mounted display 10_2*b*, a smart watch 10_2*c*, or the like.

The smart glasses 10_2*a* and the head mounted display 10_2*b* may include a display module that emits a display image and a reflector that reflects the emitted display screen and provides it to the user's eyes, thereby providing a screen of virtual reality or augmented reality to the user.

The smart watch 10_2*c* includes a biometric sensor as an input device, and may provide biometric information recognized through the biometric sensor to a user through a display module.

FIG. 19 illustrates a case where an electronic device including a display module is applied to a vehicle. For example, the electronic device 10_3 may be applied to an instrument panel, a center fascia, or the like of a vehicle, or may be applied to a CID (Center Information Display) disposed on a dashboard of a vehicle, a room mirror display in place of a side mirror, or the like.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

The display device and the electronic device according to embodiments of the present disclosure may include a scan driver with reduced power consumption.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
a plurality of pixels;
a plurality of scan lines; and
a scan driver connected to the plurality of pixels by the plurality of scan lines,
wherein the scan driver comprises a plurality of scan stages configured to provide a plurality of scan signals to the plurality of scan lines,
wherein each of the scan stages comprises:
a first node voltage setting circuit configured to set a voltage of a first node based on a previous first carry signal received from a previous scan stage; and
a carry signal providing circuit configured to generate a first carry signal based on a clock signal and the voltage of the first node,
wherein the first node voltage setting circuit comprises:
a transistor comprising a gate electrode connected to the first node and a first electrode connected to a second node:
wherein the carry signal providing circuit comprises:
a clock input transistor comprising a gate electrode connected to the first node and a first electrode configured to receive the clock signal.

2. The display device of claim 1,
wherein each of the scan stages further comprises:
an amplification circuit configured to generate a first amplified signal based on the first carry signal; and
a scan signal providing circuit configured to generate a scan signal based on the first amplified signal.

3. The display device of claim 2,
wherein the first node voltage setting circuit is further configured to receive a next second carry signal from a next scan stage, and set the voltage of the first node further based on the next second carry signal.

4. The display device of claim 3,
wherein the carry signal providing circuit is further configured to generate a second carry signal based on the voltage of the first node and the clock signal,
wherein the carry signal providing circuit is further configured to invert the second carry signal to generate the first carry signal.

5. The display device of claim 4,
wherein the amplification circuit is further configured to generate the first amplified signal further based on the second carry signal.

6. A display device, comprising:
a plurality of pixels;
a plurality of scan lines; and
a scan driver connected to the plurality of pixels by the plurality of scan lines,
wherein the scan driver comprises a plurality of scan stages configured to provide a plurality of scan signals to the plurality of scan lines,
wherein each of the scan stages comprises:
a first node voltage setting circuit configured to set a voltage of a first node based on a previous first carry signal received from a previous scan stage; and
a carry signal providing circuit configured to generate a first carry signal based on a clock signal and the voltage of the first node,
wherein the carry signal providing circuit comprises:
a clock input transistor comprising a gate electrode connected to the first node and a first electrode configured to receive the clock signal,
wherein each of the scan stages further comprises:
a width determining circuit configured to generate a third carry signal that determines a width of a scan signal based on the first carry signal and a previous third carry signal.

7. The display device of claim 6,
wherein each of the scan stages further comprises:
an amplification circuit configured to generate a first amplified signal based on the third carry signal; and
a scan signal providing circuit configured to generate a scan signal based on the first amplified signal.

8. The display device of claim 7, wherein the first node voltage setting circuit is further configured to receive a next second carry signal from a next scan stage, and set a voltage of the first node further based on the next second carry signal.

9. The display device of claim 8, wherein the carry signal providing circuit is further configured to generate a second carry signal based on the voltage of the first node and the clock signal, wherein the carry signal providing circuit is further configured to invert the second carry signal to generate the first carry signal.

10. The display device of claim 9, wherein the width determining circuit is further configured to generate the first amplified signal further based on the second carry signal.

11. An electronic device, comprising:

a processor configured to provide image data; and a display device configured to display an image based on grayscales of the image data, wherein the display device comprises:

a plurality of pixels;

a plurality of scan lines; and a scan driver connected to the plurality of pixels by the plurality of scan lines, wherein the scan driver comprises a plurality of scan stages configured to provide a plurality of scan signals to the plurality of scan lines, wherein each of the scan stages comprises:

a first node voltage setting circuit configured to set a voltage of a first node based on a previous first carry signal received from a previous scan stage; and a carry signal providing circuit configured to generate a first carry signal based on the voltage of the first node and a clock signal, wherein the first node voltage setting circuit comprises:

a transistor comprising a gate electrode connected to the first node and a first electrode connected to a second node;

wherein the carry signal providing circuit comprises:

a clock input transistor comprising a gate electrode connected to the first node, and a first electrode configured to receive the clock signal.

12. The electronic device of claim 11, wherein each of the scan stages further comprises:

an amplification circuit configured to generate a first amplified signal based on the first carry signal; and a scan signal providing circuit configured to generate a scan signal based on the first amplified signal.

13. The electronic device of claim 12, wherein the first node voltage setting circuit is further configured to receive a next second carry signal from a next scan stage, and set the voltage of the first node further based on the next second carry signal.

14. The electronic device of claim 13, wherein the carry signal providing circuit is configured to generate a second carry signal based on the voltage of the first node and the clock signal, wherein the carry signal providing circuit is further configured to invert the second carry signal to generate the first carry signal.

15. The electronic device of claim 14, wherein the amplification circuit is further configured to generate the first amplified signal further based on the second carry signal.

16. The electronic device of claim 11, wherein each of the scan stages further comprises:

a width determining circuit configured to generate a third carry signal that determines a width of a scan signal based on the first carry signal and a previous third carry signal.

17. The electronic device of claim 16, wherein each of the scan stages further comprises:

an amplification circuit configured to generate a first amplified signal based on the third carry signal; and a scan signal providing circuit configured to generate a scan signal based on the first amplified signal.

18. The electronic device of claim 17, wherein the first node voltage setting circuit is further configured to receive a next second carry signal from a next scan stage, and set the voltage of the first node further based on the next second carry signal.

19. The electronic device of claim 18, wherein the carry signal providing circuit is further configured to generate a second carry signal based on the voltage of the first node and the clock signal, wherein the carry signal providing circuit is further configured to invert the second carry signal to generate the first carry signal.

20. The electronic device of claim 19, wherein the width determining circuit is further configured to generate the first amplified signal further based on the second carry signal.

* * * * *